(12) United States Patent
Leppanen et al.

(10) Patent No.: US 10,459,226 B2
(45) Date of Patent: Oct. 29, 2019

(54) RENDERING OF A NOTIFICATION ON A HEAD MOUNTED DISPLAY

(71) Applicant: Nokia Technologies Oy, Espoo (FI)

(72) Inventors: Jussi Leppanen, Tampere (FI); Antti Eronen, Tampere (FI); Arto Lehtiniemi, Lempaala (FI); Lasse Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/576,986

(22) PCT Filed: May 26, 2016

(86) PCT No.: PCT/FI2016/050364
§ 371 (c)(1),
(2) Date: Nov. 27, 2017

(87) PCT Pub. No.: WO2016/189204
PCT Pub. Date: Dec. 1, 2016

(65) Prior Publication Data
US 2018/0164588 A1 Jun. 14, 2018

(30) Foreign Application Priority Data
May 28, 2015 (EP) ..................... 15169525

(51) Int. Cl.
*G02B 27/01* (2006.01)
*G06F 3/01* (2006.01)
(Continued)

(52) U.S. Cl.
CPC ........... *G02B 27/017* (2013.01); *G06F 3/012* (2013.01); *G06F 3/013* (2013.01); *G06F 3/016* (2013.01);
(Continued)

(58) Field of Classification Search
CPC .... G02B 2027/0141; G02B 2027/0178; G02B 27/017; G06F 2203/0339; G06F 3/012;
(Continued)

(56) References Cited

U.S. PATENT DOCUMENTS 9,176,582 B1 * 11/2015 Johnson ................. G06F 1/163
2011/0061100 A1 * 3/2011 Mattila .................. G06F 3/017
726/17

(Continued)

*Primary Examiner* — Dmitry Bolotin
(74) *Attorney, Agent, or Firm* — Harrington & Smith

(57) ABSTRACT

A method including determining occurrence of a virtual information region event, the virtual information region event indicating a change of information that is allocated to a virtual information region that is at least partially beyond a field of view of a head mounted display, the virtual information region having a virtual information region location that is in a direction from the field of view, causing rendering of a non-visual notification that is indicative of the direction from the field of view in response to the virtual information region event, receiving information indicative of a visual notification invocation input, determining a visual notification that is visually descriptive of at least one aspect of the virtual information region event in response to the visual notification invocation input, and causing display of the visual notification on the head mounted display is disclosed.

13 Claims, 15 Drawing Sheets

(51) Int. Cl.
    *G06F 3/048* (2013.01)
    *G06F 3/16* (2006.01)
    *H04M 1/725* (2006.01)
    *G06F 3/0354* (2013.01)

(52) U.S. Cl.
    CPC .............. *G06F 3/048* (2013.01); *G06F 3/167*
        (2013.01); *G02B 2027/0141* (2013.01); *G02B
            2027/0178* (2013.01); *G06F 3/03547*
            (2013.01); *G06F 3/165* (2013.01); *G06F
        2203/0339* (2013.01); *H04M 1/7253* (2013.01)

(58) Field of Classification Search
    CPC ...... G06F 3/013; G06F 3/016; G06F 3/03547;
                G06F 3/048; G06F 3/165; G06F 3/167;
                                        H04M 1/7253
    See application file for complete search history.

(56) References Cited

U.S. PATENT DOCUMENTS

| | | | |
|---|---|---|---|
| 2012/0212414 A1 | 8/2012 | Osterhout et al. | 345/158 |
| 2012/0310717 A1* | 12/2012 | Kankainen | G06Q 30/02 705/14.4 |
| 2014/0375683 A1* | 12/2014 | Salter | G06F 3/013 345/633 |
| 2015/0022551 A1* | 1/2015 | Kim | G06T 19/006 345/633 |
| 2015/0042679 A1* | 2/2015 | Jarvenpaa | G06T 19/006 345/633 |
| 2016/0171767 A1* | 6/2016 | Anderson | G06F 3/011 345/633 |
| 2018/0164588 A1* | 6/2018 | Leppanen | G06F 3/012 |

\* cited by examiner

RENDERING OF A NOTIFICATION ON A HEAD MOUNTED DISPLAY

TECHNICAL FIELD

The present application relates generally to rendering of a notification on a head mounted display.

BACKGROUND

As electronic apparatuses become increasingly prevalent and pervasive in our society, people increasingly utilize electronic apparatuses to view information. Many users may utilize electronic apparatuses for purposes relating to viewing particular information. As such, it may be desirable to configure an electronic apparatus such that the electronic apparatus facilitates viewing particular information in an intuitive and simple manner.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for determining occurrence of a virtual information region event, the virtual information region event indicating a change of information that is allocated to a virtual information region that is at least partially beyond a field of view of a head mounted display, the virtual information region having a virtual information region location that is in a direction from the field of view, causing rendering of a non-visual notification that is indicative of the direction from the field of view in response to the virtual information region event, receiving information indicative of a visual notification invocation input, determining a visual notification that is visually descriptive of at least one aspect of the virtual information region event in response to the visual notification invocation input, and causing display of the visual notification on the head mounted display.

One or more example embodiments may provide an apparatus, a computer readable medium, a computer program product, and/or a non-transitory computer readable medium having means for determining occurrence of a virtual information region event, the virtual information region event indicating a change of information that is allocated to a virtual information region that is at least partially beyond a field of view of a head mounted display, the virtual information region having a virtual information region location that is in a direction from the field of view, means for causing rendering of a non-visual notification that is indicative of the direction from the field of view in response to the virtual information region event, means for receiving information indicative of a visual notification invocation input, means for determining a visual notification that is visually descriptive of at least one aspect of the virtual information region event in response to the visual notification invocation input, and means for causing display of the visual notification on the head mounted display.

An apparatus comprising at least one processor and at least one memory, the memory comprising machine-readable instructions, that when executed cause the apparatus to perform determination of occurrence of a virtual information region event, the virtual information region event indicating a change of information that is allocated to a virtual information region that is at least partially beyond a field of view of a head mounted display, the virtual information region having a virtual information region location that is in a direction from the field of view, causation of rendering of a non-visual notification that is indicative of the direction from the field of view in response to the virtual information region event, receipt of information indicative of a visual notification invocation input, determination of a visual notification that is visually descriptive of at least one aspect of the virtual information region event in response to the visual notification invocation input, and causation of display of the visual notification on the head mounted display.

In at least one example embodiment, a program is allocated to the virtual information region and the determination of the occurrence of the virtual information region event comprises determination that an event associated with the program has occurred.

In at least one example embodiment, the determination of the occurrence of the virtual information region event comprises receipt of information by the program, and determination that the received information causes a change of information that is allocated to the virtual information region.

One or more example embodiments further perform allocation of the program to the virtual information region.

In at least one example embodiment, the virtual information region being at least partially beyond the field of view of the head mounted display indicates circumstances where less than the entirety of the virtual information region is within the field of view of the head mounted display.

In at least one example embodiment, the virtual information region being at least partially beyond the field of view of the head mounted display indicates circumstances where the entirety of the virtual information region is beyond the field of view of the head mounted display.

In at least one example embodiment, the virtual information region location is a location in a physical environment surrounding the head mounted display that is designated for display of a representation of information allocated to the virtual information region in circumstances where the field of view of the head mounted display includes the location of the physical environment.

In at least one example embodiment, the direction from the field of view corresponds with at least a portion of a boundary of the field of view that is most proximate to the virtual information region location.

In at least one example embodiment, the direction from the field of view is at least one of a leftward direction, a rightward direction, a rearward direction, an upward direction, or a downward direction.

In at least one example embodiment, the causation of rendering of the non-visual notification is performed absent display of any visual notification indicative of the virtual information region event.

In at least one example embodiment, the non-visual notification is a notification that is absent any visual representation indicative of the virtual information region event.

In at least one example embodiment, the non-visual notification is a haptic notification.

In at least one example embodiment, the rendering of the haptic notification comprises actuation of at least one output device that is at a position on the head mounted display that corresponds with the direction from the field of view.

In at least one example embodiment, the non-visual notification is a spatial audio notification.

In at least one example embodiment, the rendering of the spatial audio notification comprises rendering a spatial audio signal such that a perceived location of the spatial audio signal corresponds with the direction from the field of view.

In at least one example embodiment, the receipt of information indicative of the visual notification invocation input comprises receipt of information indicative of an input, and determination that the input is the visual notification invocation input.

In at least one example embodiment, the determination of the visual notification is based, at least in part, on the determination of the visual notification invocation input.

In at least one example embodiment, the visual notification invocation input comprises a touch input at a position on the head mounted display that corresponds with the direction from the field of view.

In at least one example embodiment, the visual notification invocation input comprises a movement input from the position on the head mounted display towards the field of view.

In at least one example embodiment, the non-visual notification is a haptic notification rendered at the position on the head mounted display.

One or more example embodiments further perform determination that the virtual information region is beyond the field of view.

In at least one example embodiment, the causation of rendering of the non-visual notification is based, at least in part, on the determination that the virtual information region is beyond the field of view.

One or more example embodiments further perform termination of display of the visual notification.

One or more example embodiments further perform determination that a threshold duration has elapsed subsequent to display of the visual notification.

In at least one example embodiment, the termination of display of the visual notification is performed in response to the determination that the threshold duration has elapsed.

One or more example embodiments further perform receipt of information indicative of a notification termination input.

In at least one example embodiment, the termination of display of the visual notification is performed in response to the notification termination input.

One or more example embodiments further perform determination, by way of gaze tracking, that a gaze of the user fails to correspond with the notification for a threshold duration.

In at least one example embodiment, the termination of display of the visual notification is performed in response to the determination that the gaze of the user fails to correspond with the notification for the threshold duration.

One or more example embodiments further perform determination that a threshold duration has failed to elapse between the rendering of the non-visual notification and the visual notification invocation input.

In at least one example embodiment, the determination of the visual notification is based, at least in part, on the determination that the threshold duration has failed to elapse between the rendering of the non-visual notification and the visual notification invocation input.

One or more example embodiments further perform receipt of information indicative of a visual notification selection input, and changing of the virtual information region location of the virtual information region to a different virtual information region location that is within the field of view in response to the visual notification selection input.

In at least one example embodiment, the visual notification selection input is a double tap input on the side of the head mounted display.

One or more example embodiments further perform determination that a threshold duration has elapsed subsequent to the receipt of the visual notification selection input, and reversion from the different virtual information region location of the virtual information region to the virtual information region location in response to the determination that the threshold duration has elapsed.

One or more example embodiments further perform prior to receipt of the information indicative of the visual notification invocation input, determination of occurrence of a different virtual information region event, the different virtual information region event indicating a change of information that is allocated to a different virtual information region that is at least partially beyond the field of view, the different virtual information region having a different virtual information region location that is in a different direction from the field of view, prior to receipt of the information indicative of the visual notification invocation input, causation of rendering of a different non-visual notification that is indicative of the different direction from the field of view in response to the different virtual information region event, and determination that the visual notification invocation input corresponds with the virtual information region event.

In at least one example embodiment, the determination of the visual notification is performed in response to the determination that the visual notification invocation input corresponds with the virtual information region event.

BRIEF DESCRIPTION OF THE DRAWINGS

For a more complete understanding of one or more example embodiments, reference is now made to the following descriptions taken in connection with the accompanying drawings in which.

DETAILED DESCRIPTION OF THE DRAWINGS

Figure 1:
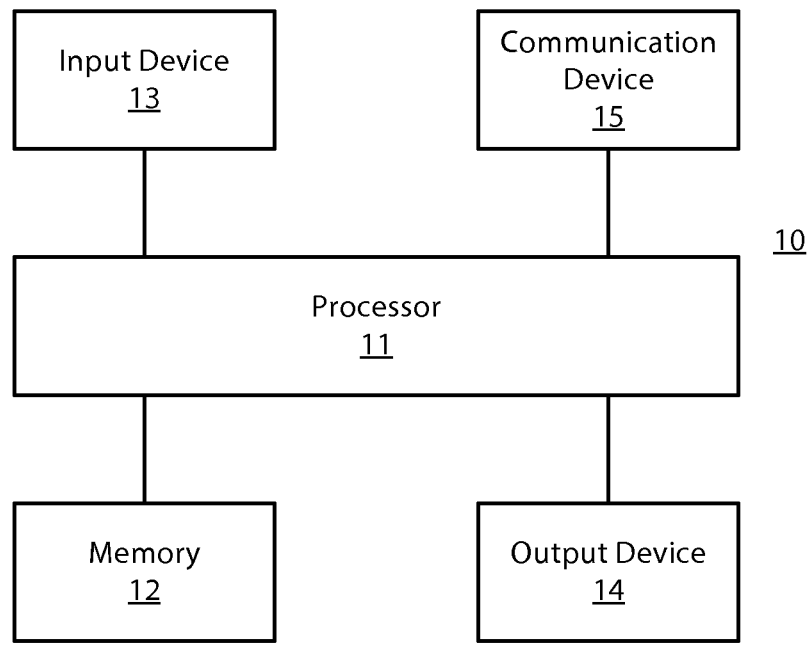
FIG. 1 is a block diagram showing an apparatus according to at least one example embodiment.

Various example embodiments and some of their potential advantages are understood by referring to FIGS. 1 through 9 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a head mounted display, a see through display, a virtual reality display, an augmented reality display, a wearable apparatus, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

FIGS. 2A-2E are diagrams illustrating head mounted displays according to at least one example embodiment. The examples of FIGS. 2A-2E are merely examples and do not limit the scope of the claims. For example, the display type may vary, the configuration of the display may vary, the shape of the display may vary, and/or the like.

In many circumstances, a user may desire to interact with an electronic device. In such circumstances, it may often be desirable for the user to interact with an electronic apparatus by way of a head mounted display. For example, the user may interact with a program interaction screen associated with a program. In some circumstances, it may be desirable for a head mounted display to be a see through display. In at least one example embodiment, a see through display is a display that presents information to a user, but through which objects on an opposite side of the display from the user may be seen. A see through display may be comprised by a window, a windshield, a visor, glasses, and/or the like. A head mounted display may, for example, be a display that is head mountable, a display that is coupled to an element that is wearable at a location on and/or proximate to the head of a user, a display that is wearable at a location on and/or proximate to the head of a user, and/or the like. In at least one example embodiment, a head mounted display is a see through head mounted display.

Figure 2A:
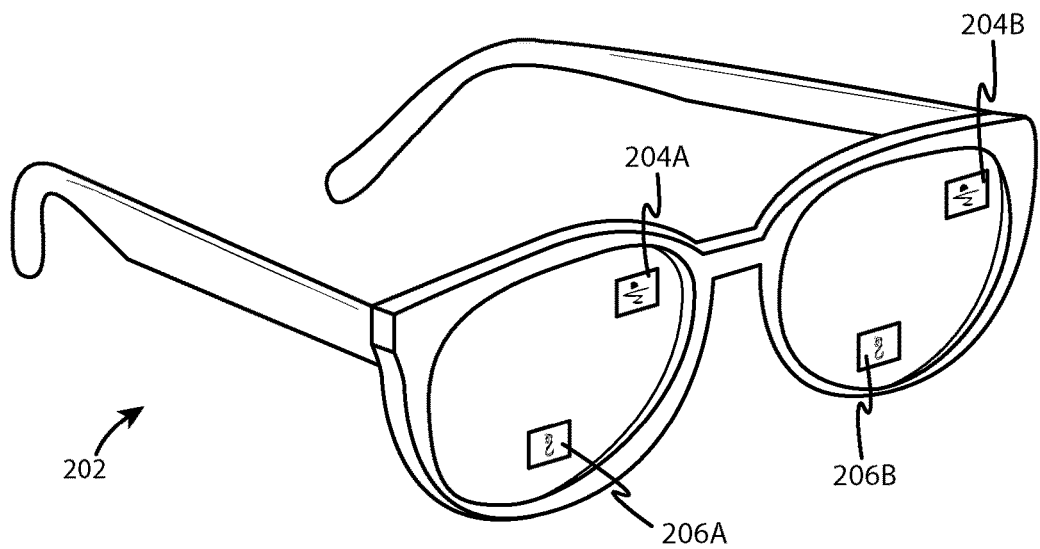
FIGS. 2A-2E are diagrams illustrating head mounted displays according to at least one example embodiment.

FIG. 2A is a diagram illustrating display 202 according to at least one example embodiment. In the example of FIG. 2A, display 202 is illustrated as a see through display, though display 202 may be any type of display. For example, display 202 may be a non-see through display. In at least one example embodiment, a see through display is a near eye display. A near eye display may be a see through display that is positioned proximate to an eye of the user. The example of FIG. 2A illustrates display 202 as glasses that comprise a near eye display in each lens. In the example of FIG. 2A, the right near eye display is displaying information 204A and 206A, and the left near eye display is displaying information 204B and 206B. In at least one example embodiment, information 204A may be associated with information 204B. For example, the content of information 204A may be identical to content of information 204B. In some circumstances, even though the content may be identical between 204A and 204B, position of information 204A on the right near eye display may vary from position of information 204B on the left near eye display. In this manner, the apparatus may vary position of information between the left near eye display and right near eye display to vary the parallax of the information perceived by the user. In this manner, the apparatus may vary the perceived depth of the information by the user.

Figure 2B:
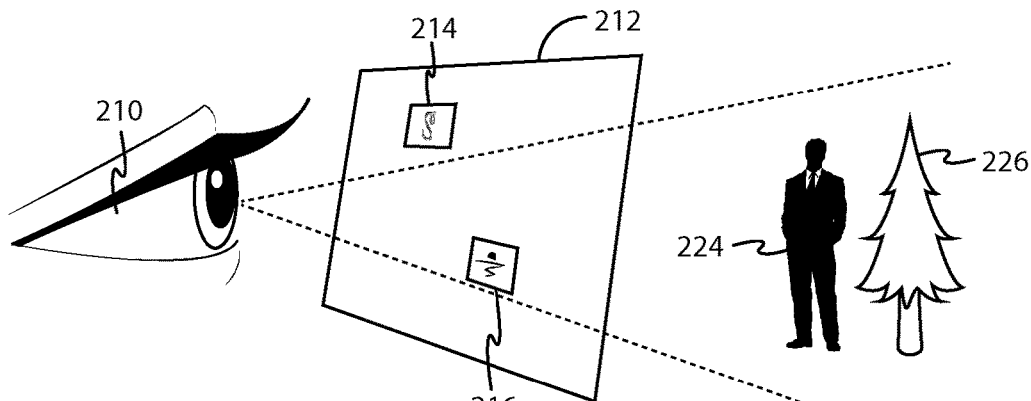

FIG. 2B is a diagram illustrating see through display 212 according to at least one example embodiment. In at least one example embodiment, displaying information on a see through display so that the information corresponds with one or more objects viewable through the see through display is referred to as augmented reality. In the example of FIG. 2B, user 210 may perceive objects 224 and 226 through see through display 212. In at least one example embodiment, the see through display may display information to the user. For example, display 212 may display information 214 and information 216. Information 214 and information 216 may be positioned on display 212 such that the information corresponds with one or more objects viewable through see through display 212, such as object 224. In such an example, information 214 may be associated with, identify, and/or the like, object 224. For example, information 214 may indicate an identity of object 224. In at least one example embodiment, display 212 may be comprised by a head mounted display.

Figure 2C:
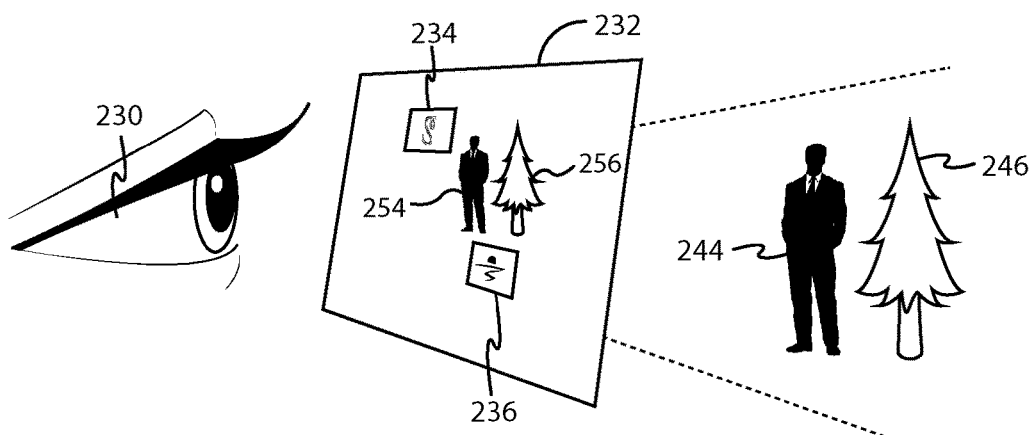

FIG. 2C is a diagram illustrating display 232 according to at least one example embodiment. In at least one example embodiment, displaying information on a display so that the information corresponds with one or more representations of objects displayed on the display is referred to as augmented reality. In some circumstances, a representation of an object may refer to an image of an object. For example, a camera module may capture camera information that comprises information indicative of the object. The camera information may comprise video information, image information, and/or the like. This camera information may then be displayed on a display such that the camera information is a representation of the object. In the example of FIG. 2C, user 230 may perceive representations 254 and 256 displayed on display 232. Representations 254 and 256 may be images of objects captured by an apparatus. For example, a camera module may capture camera information indicative of objects 244 and 246 such that the camera information is displayed on display 232 as representations 254 and 256. In at least one example embodiment, the display may display information to the user. For example, display 232 may display information 234 and information 236. Information 234 and information 236 may be positioned on display 232 such that the information corresponds with one or more representations of objects displayed on display 232, such as representation 254. In such an example, information 234 may be associated with, identify, and/or the like, representation 254. For example, information 234 may indicate an identity of representation 254. In at least one example embodiment, display 232 may be comprised by a head mounted display.

As previously described, in some circumstances, an electronic apparatus may comprise an input device such as a touch sensor, a force sensor, a motion sensor, and/or the like. In some circumstances, it may be desirable to locate an input device at a particular position on an apparatus. For example, if the electronic apparatus is a head mounted display comprises glasses similar as depicted in the example of FIG. 2A, it may be desirable to locate one or more input devices on either or both of the temples of the head mounted display. For example, it may be intuitive for a user to enter touch inputs on the temples of a head mounted display comprising glasses, mounting an input device in a head mounted display may reduce the size and/or footprint of an electronic apparatus comprising the display, and/or the like. For example, it may be easy for a user to reach to the side of the user's head, the user may find performing a touch input such as a swipe on a glasses temple to be a natural motion, and/or the like. In at least one embodiment, a head mounted display comprises an input device.

Figure 2D:
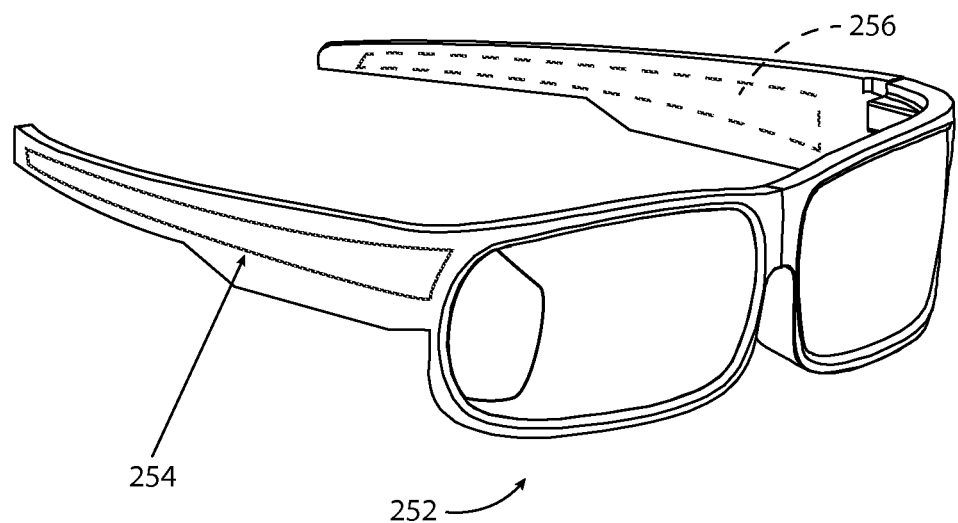

FIG. 2D is a diagram illustrating display 252 according to at least one example embodiment. In the example of FIG. 2D, display 252 is illustrated as a head mounted display comprising glasses, though display 252 may be any type of head mounted display. The example of FIG. 2D illustrates display 252 as glasses that comprise input device 254 on the right temple, and input device 256 on the left temple. Input devices 254 and 256 may be similar as described regarding input device 13 of FIG. 1. For example, input devices 254 and/or 256 may comprise a touch sensor. In this manner, a user of display 252 may interact with display 252 by way of entering a touch input by way of input device 254 and/or 256.

As previously described, in some circumstances an electronic apparatus may comprise an output device such as an earphone, a speaker, a vibration transducer, and/or the like. In some circumstances, it may be desirable to locate an output device at a particular position on an apparatus. For example, if the electronic apparatus is a head mounted display comprising glasses similar as depicted in the example of FIG. 2A, it may be desirable to locate one or more output devices on either or both of the temples of the head mounted display. For example, a user may easily detect vibrations from a vibration transducer mounted on head mounted display, mounting speakers on a head mounted display at particular positions may facilitate rendering of spatial audio, and/or the like. Spatial audio may, for example, be audio that is perceived to be projected from a certain location in physical space, audio that is perceived to emanate from a particular localized source and/or direction, and/or the like. In at least one embodiment, a head mounted display comprises an output device. In at least one example embodiment, an output device is a haptic output device. A haptic output device may refer to a tactile output device similar as described regarding FIG. 1. In at least one example embodiment, an output device is a spatial audio device. A spatial audio device may refer to a device that may render a spatial audio signal. A spatial audio signal may refer to an audio signal with a perceived origin. For example, a spatial audio device may comprise multiple audio speakers, such as a left speaker and a right speaker. A user of a spatial audio device may perceive sound rendered on the left speaker as occurring from the left of the user, sound rendered from the right speaker as occurring from the right of the user, and/or the like. A spatial audio device may utilize headphones, speakers, and/or the like to render a spatial audio field to the user using binaural audio rendering techniques, head-related transfer functions, and/or the like. A spatial audio device may utilize head tracking techniques in order to aid the spatial audio rendering. A spatial audio device may utilize more than two speakers, such as a surround sound system, may utilize sound localization algorithms to simulate a particular origin of a sound location, and/or the like. In some circumstances, a perceived origin of a sound may differ from the actual origin of the sound.

Figure 2E:
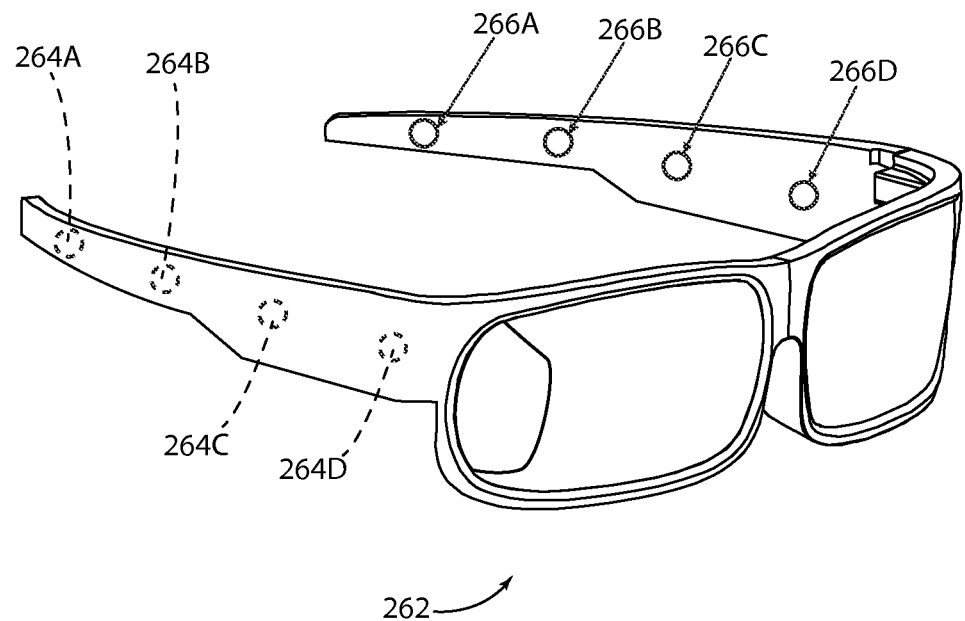

FIG. 2E is a diagram illustrating display 262 according to at least one example embodiment. In the example of FIG. 2E, display 262 is illustrated as a head mounted display comprising glasses, though display 262 may be any type of head mounted display. The example of FIG. 2E illustrates display 262 as glasses that comprise output devices 264A, 264B, 264C, and 264D on the right temple, and output devices 266A, 266B, 266C, and 266D on the left temple. Output devices 264A-264D and 266A-266D may be similar as described regarding output device 14 of FIG. 1. For example, output devices 264A-264D and/or 266A-266D may comprise one or more speakers, one or more vibration transducers, and/or the like. In this manner, display 262 may render output by way of output devices 264A-264D and/or 266A-266D.

In some situations, a user of an electronic apparatus may direct their attention to the electronic apparatus. For example, a user wearing a head mounted display may wish to interact with applications displayed on a head mounted display, view information displayed on a head mounted display, and/or the like. For example, the user may fixate on a display of the electronic apparatus, may fixate on particular information displayed by the electronic apparatus, may interact with the electronic apparatus, and/or the like. In such situations, the user may incidentally direct their attention away from the environment surrounding the user, at least part of the environment surrounding the user, from other information displayed on the apparatus, and/or the like. In such situations, the user may desire to be able to perceive happenings that may have occurred in relation to at least part of the environment surrounding the user while the user's attention was directed away from the part of the environment, directed towards a different part of the environment, and/or the like. For example, the user may desire the user's electronic apparatus to monitor the direction of the user's attention and to cause performance of certain predetermined functions based on the direction of the user's attention.

In some circumstances, it may be desirable to determine a direction of the user's attention based, at least in part, on a direction that the user is gazing, a depth at which the user is gazing, and/or the like. For example, the user gazing in a particular direction may indicate that the user's attention is directed in the particular direction. For instance, the attention of a user wearing a head mounted display may be directed to an application displayed on a head mounted display, directed at information displayed on a head mounted display, and/or the like. In another example, the user gazing at the user's electronic apparatus may indicate that the user's attention is directed away from at least part of the environment surrounding the user. For instance, when the user of a head mounted display's attention is focused on information displayed on the display, the user may not be viewing objects in the surrounding environment. In yet another example, the user gazing at a particular part of a display may indicate that the user's attention is directed away from a different part of the display. For example, the user may be viewing a particular application displayed on a particular part of the display, and not viewing another application displayed on a different part of the display. In at least one example embodiment, an apparatus determines a direction of a user's attention based, at least in part, on a gaze position of the user. In at least one example embodiment, an apparatus determines a gaze position of a user. Determination of the gaze position, the direction of a user's attention, and/or the like may be referred to as gaze tracking. In at least one example embodiment, an apparatus comprising a head mounted display performs gaze tracking.

FIGS. 3A-3G are diagrams illustrating virtual information regions according to at least one example embodiment. The examples of FIGS. 3A-3G are merely examples and do not limit the scope of the claims. For example, the location of virtual information regions may vary, the information allocated to virtual information regions may vary, the apparatus utilizing virtual information regions may vary, and/or the like.

As previously described, a user may wear a head mounted display, interact with a head mounted display, and/or the like. In many circumstances, a head mounted display may have a field of view. For example, a see-through head mounted display may have a field of view that is bounded by one or more display frames, bezels, boundaries, edges, and/or the like. Objects, the environment, and/or the like that are observable by a user of a see-through head mounted display outside of such boundaries may be considered outside of the field of view of the see-through head mounted display. In some circumstances (e. g, the head mounted display is an enclosed head mounted display), a user viewing an image on a see through head mounted display may be unable to perceive real world objects, the outside environment, and/or the like beyond the field of view of the head mounted display while wearing the head mounted display. In some circumstances, a user may be unable to view images displayed on a head mounted display within the field of view of the head mounted display when the head mounted display is not worn by the user.

Figure 3A:
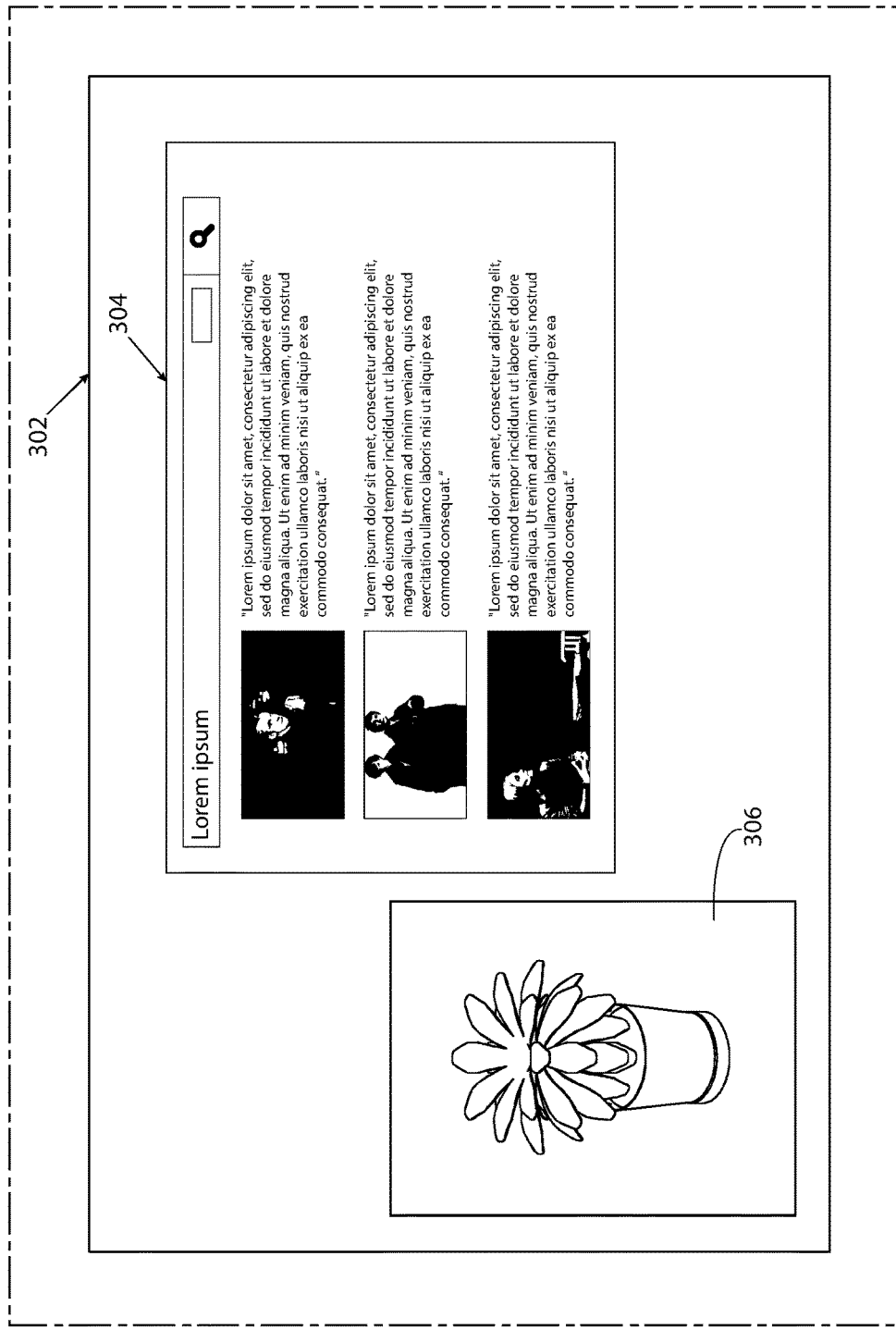
FIGS. 3A-3G are diagrams illustrating virtual information regions according to at least one example embodiment.

FIG. 3A is a diagram illustrating field of view 302 of a head mounted display according to at least one example embodiment. In the example of FIG. 3A, field of view 302 is illustrated as a field of view through of a see through head mounted display, though field of view 302 may be representative of a field of view of a non-see through display. In the example of FIG. 3A, it can be seen that field of view 302 is bounded on the top, the bottom, the left, and the right. In this manner, a real world object that is not viewable within the boundaries of field of view 302 is beyond of the field of view of field of view 302. In the example of FIG. 3A, information 304 is displayed within the field of view 304. Information 304 may be similar as described regarding FIGS. 2A-2E, or may be any other type of information, imagery, and/or the like that may be displayed on a display. In the example of FIG. 3A, object 306 is viewable through the head mounted display of field of view 302. Object 306 may be similar as described regarding objects 224 and 226 of FIG. 2B, objects 244 and 246 of FIG. 2C, or may be any object, portion of an environment, and/or the like.

When viewing information on a head mounted display, a user may perceive the information as being associated with a particular location in an environment. For example, if the head mounted display is a see through display, the user may perceive information viewed through the head mounted display as appearing within a particular region of the real world environment that is viewable through the head mounted display. Similarly, if the head mounted display is a non-see through display, the user may perceive the information to be displayed within a particular region of a virtual environment. A region within an environment in which information displayed on a head mounted display seems to appear may be referred to as a virtual information region. The location of a virtual information region within an environment may be referred to as a virtual information region location. In at least one example embodiment, a virtual information region location is a location in a physical environment surrounding a head mounted display that is designated for display of a representation of information allocated to the virtual information region. In at least one example embodiment, a head mounted display displays a representation of information allocated to a virtual information region in circumstances where the field of view of the head mounted display includes the location of the physical environment.

Figure 3B:
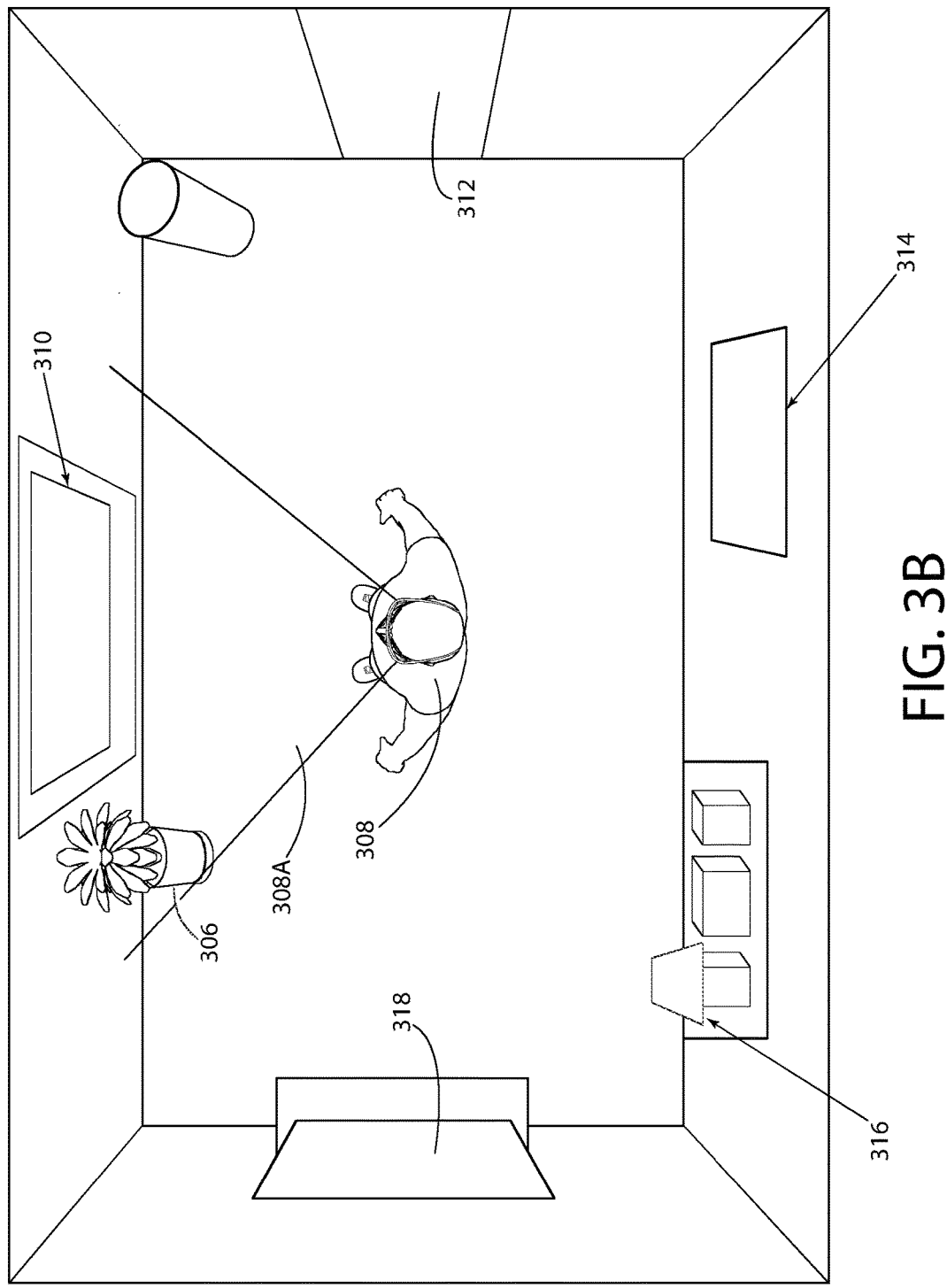

FIG. 3B is a diagram illustrating a top down perspective view of user 308 viewing a real world environment while wearing the see through head mounted display of FIG. 3A. Even though the example of FIG. 3B illustrates a real world environment, the example of FIG. 3B may be analogous to a user viewing a virtual environment on a non-see through head mounted display. In the example of FIG. 3B, user 308 has a user field of view 308A that includes field of view 302 of FIG. 3A, viewable through the head mounted display. The field of view of a user may be a portion of the environment surrounding the user that the user is able to naturally perceive within the user's vision, peripheral vision, and/or the like. In some circumstances, the field of view of a user may differ from the field of view of a head mounted display. In the example of FIG. 3B, user field of view 308A is approximately equivalent to field of view 302 of FIG. 3A. For example, it can be seen that the portion of object 306 that is viewable within field of view 302 of FIG. 3A falls within the bounds of user field of view 308A in the example of FIG. 3B. In this manner, in the example of FIG. 3B, user 308 may see information 304 of FIG. 3A.

In the example of FIG. 3B, various regions are illustrated in the environment. For example, it can be seen that the environment comprises regions 310, 312, 314, 316, and 318 at various locations within the environment. It can be seen that in the example of FIG. 3B, region 310 appears within user field of view 308A. In this manner, user 308 may perceive information 304 as appearing at the location of region 310 when viewing information 304. In this manner, region 310 may be a virtual information region. In the example of FIG. 3B, it can be seen that regions 312, 314, 316, and 318 have locations that fall outside of user field of view 308. In this manner, in the example of FIG. 3B, regions 312, 314, 316, and 318 are beyond the field of view of the head mounted display worn by user 308.

In some circumstances, when a user is wearing a head mounted display, a user may associate a region of an environment beyond a field of view of a head mounted display, such as a virtual information region, as having a direction from the field of view of the head mounted display. For example, a user of a head mounted display may associate a region as being upward, downward, leftward, rightward, and/or the like from the field of view of a head mounted display. For instance, the user may perceive the environment as a 360 degree panorama. In at least one example embodiment, a direction from the field of view is one of a leftward direction, a rightward direction, a rearward direction, an upward direction, downward direction, and/or the like.

Figure 3C:
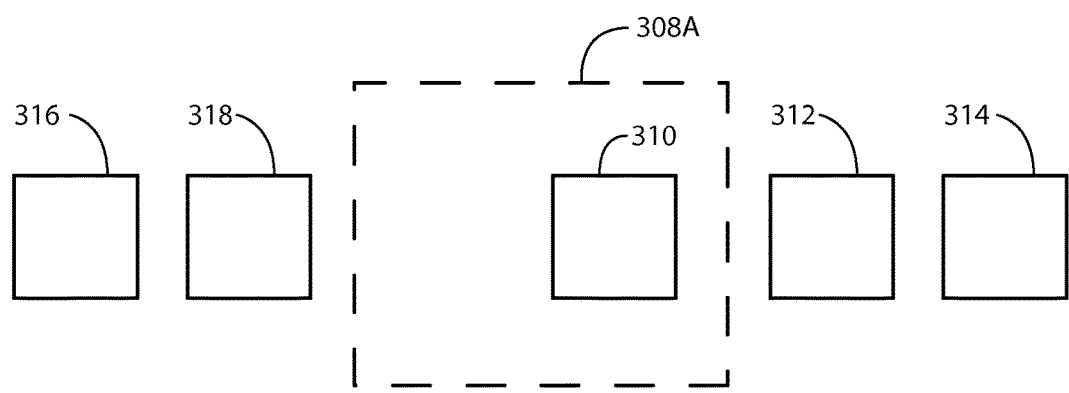

The example of FIG. 3C illustrates a 360 degree panoramic representation of the environment of FIG. 3B centered approximately on the center of the wall within the field of view of user 308 of FIG. 3B. In the panoramic representation of FIG. 3C, it can be seen that regions 312 and 314 are illustrated to the right of field of view 308A, and that regions 316 and 318 appear to the left of field of view 308A. As previously described, it should be understood that field of view 308A is approximately equivalent to field of view 302 of FIG. 3A. In this manner, user 308 may associate regions 312 and 314 as having a rightward direction from field of view 302 of FIG. 3A, and user 308 may associate regions 316 and 318 as having a leftward direction from field of view 302 of FIG. 3A. In some circumstances, a perceived direction of a region from a field of view may differ from an actual direction of a region from a field of view. For example, even though user 308 of FIG. 3B may perceive region 314 has having a rightward direction from field of view 302 of FIG. 3A, it can be seen that region 314 is rearward from user field of view 308A in the example of FIG. 3B. In at least one example embodiment, the direction of a virtual information region from a field of view corresponds with at least a portion of a boundary of the field of view that is most proximate to the virtual information region location.

In some circumstances, a virtual information region may be obscured by an object between a field of view of a head mounted display and the virtual information region. For example, the virtual information region may be a region behind a wall positioned between the virtual image region and the head mounted display. In circumstances such as these, the virtual information region may be described as being in a forward direction of the field of view of the head mounted display.

In some circumstances, a user may wish that a head mounted display preclude displaying particular information when the head mounted display has a particular point of view. For example, a head mounted display may display information associated with a program, and the information may be associated with a real world object. The user may wish for the display to preclude displaying the information when the real world object is beyond the field of view of the head mounted display. In circumstances such as these, it may be desirable to allocate the information to a virtual information region. For example, a head mounted display may determine the orientation of the head mounted display, the position of the head mounted display in the environment, the gaze of the user, the field of view of the head mounted display, and/or the like and determine that a virtual information region is beyond the field of view of the head mounted display. In this manner, the head mounted display may preclude displaying information allocated to the virtual information region when the field of view of the virtual information region is beyond the field of view of the head mounted display.

For example, information 304 of FIG. 3A may be allocated to region 310 of FIGS. 3B and 3C. As such, in this example, region 310 is a virtual information region. In this manner, if user 308 were to change positions such that region 310 no longer falls within user field of view 308A, the head mounted display displaying information 304 may terminate display of information 304. Similarly, in this example, the head mounted display may cause display of information 304 if region 310 once again falls within user field of view 308A. In at least one example embodiment, a virtual information region being at least partially beyond the field of view of the head mounted display indicates circumstances where less than the entirety of the virtual information region is within the field of view of the head mounted display. In at least one example embodiment, a virtual information region being at least partially beyond the field of view of the head mounted display indicates circumstances where the entirety of the virtual information region is beyond the field of view of the head mounted display. Information, programs, and or the like may be allocated to a virtual information region in various ways. For example, a program may have predetermined virtual information, a user may assign a virtual information region to a program by way of an input (e.g. dragging the program to a particular location), the program may allocate itself to a virtual information region based on the field of view of the head mounted display when the program is launched, and/or the like.

As previously described a user may wear a head mounted display. For example, the user may wear a head mounted display to perceive information, interact with a program, and/or the like. In some circumstances, an event may be associated with functionality of an electronic apparatus, such as an electronic apparatus comprising head mounted display. For example, an apparatus may receive an incoming message. In circumstances such as these, it may be desirable for the apparatus to determine occurrence of the event. For example, it may be desirable for the apparatus to alert the user of the event. For example, if the incoming event is a telephone call, it may be desirable to alert the user of the incoming telephone call. In at least one example embodiment, the apparatus determines occurrence of a software event. In at least one example embodiment, the software event is receipt of a message. In such an example, the determination of the occurrence of the software event may comprise receipt of the message. In at least one example embodiment, the software event is occurrence of a calendar event. Such a calendar event may be associated with a calendar entry. In such an example, the determination of the occurrence of the software event may comprise determination that a current time corresponds with an occurrence time of the calendar entry. In at least one example embodiment, the software event is a receipt of a call. In such an example, the determination of the occurrence of the software event may comprise receipt of the call.

As previously described, the apparatus may determine occurrence of a software event, such as receipt of a message, occurrence of a calendar event, receipt of a call, and/or the like. In such an example, the apparatus may determine a notification to be rendered based, at least in part, on the software event. In this manner, the notification may comprise information indicative of the software event. For example, in circumstances where the software event is receipt of a message, the notification may comprise information indicative of a sender of the message, such as contact information, name information, address information, phone number information, and/or the like. In another example, in circumstances where the software event is occurrence of a calendar event, the notification may comprise information indicative of a title of the calendar entry, an occurrence time of the calendar entry, and/or the like. In still another example, in circumstances where the software event is receipt of a call, the notification may comprise information indicative of a caller of the call, information indicative that a call in is being received, information indicative that a call has been received, and/or the like. The information indicative of a caller of the call may be any information that indicates the caller, such as contact information, name information, address information, phone number information, and/or the like.

In at least one example embodiment, the notification comprises a visual notification, an audible notification, a tactile notification, and/or the like. A visual notification may comprise visual information indicative of the notification. For example the visual indication may comprise text information, graphical information, video information, and/or the like. An audible notification may comprise audible information indicative of the notification. For example, the audible notification may comprise audible speech information, music information, tone information, or any other information that corresponds with a sound that may be actuated by an apparatus. A tactile notification may comprise tactile information indicative of the notification. For example, the tactile notification may be information that defines a vibration signal, a texture, a temperature, and/or the like.

In at least one example embodiment, causation of rendering of the notification comprises causation of display of a visual notification, causation of actuation of an audible notification, causation of actuation of a tactile notification, and/or the like. In at least one example embodiment, actuation of an audible notification comprises causation of actuation of an audio transducer, such as a speaker, such that the transducer generates an audio signal that corresponds with the audible notification. For example, the audible notification may be a song, and the actuation of the song may comprise sending information indicative of the song to a speaker such that the speaker generates an audio signal that corresponds with the song. In at least one example embodiment, actuation of a tactile notification comprises actuation of a tactile transducer, such as a vibration transducer, a heating element, a cooling element, an electromechanically controlled apparatus deformation, an electromechanically controlled texture, and/or the like. For example, the tactile notification may be a vibration signal that signifies the software event. In such an example, the rendering of the tactile notification may comprise actuation of a vibration transducer in a manner that corresponds with the vibration signal such that the user may perceive the vibration signal.

As previously described, in some circumstances, information may be allocated to a virtual information region. For example, a user may wish to view information associated with an email program on a head mounted display when the head mounted display has a particular field of view. For instance, a user may associated a particular wall in the user's home (e.g. a wall with a desk) with email, and may wish to view his email when viewing the wall through the head mounted display. As previously described, in some circumstances, an apparatus may determine occurrence of an event. For example, an email program may receive a new message. In circumstances where an event is associated with information allocated to a virtual information region, the event may be referred to as a virtual information region event.

In some circumstances, as previously described, the apparatus may notify the user of the event by way of a visual notification. For example, if the event is a software event, an apparatus may change the appearance of visual information associated with the software. For instance, if the software is an email program, the appearance of an inbox window associated with the email program may be altered to reflect the received message. In some circumstances, for instance where information associated with the software program is allocated to a virtual information region, the user of the apparatus may not perceive the visual notification. For example if the visual notification comprises changing the appearance of visual information associated with the virtual information region, the information may not be displayed on a head mounted display. For example, if the field of view of a head mounted display fails to encompass a virtual information region, the head mounted display may preclude causing display of the information. In circumstances such as these, it may be desirable to alert the user of the virtual information region event by a notification other than a change of information allocated to the virtual information region. For example, it may be desirable for the head mounted display to display a visual notification that is visually descriptive of at least one aspect of the virtual information region event. For instance, the notification may indicate what type of event occurred, a program associated with the event, and/or the like. In at least one example embodiment, an apparatus determines a visual notification that is visually descriptive of at least one aspect of a virtual information region event. In at least one example embodiment, an apparatus causes display of a visual notification on a head mounted display in response to determination of occurrence of the virtual information region event. In at least one example embodiment, the virtual information region event indicates a change of information that is allocated to a virtual information region that is at least partially beyond the field of view of the head mounted display.

Figure 3D:
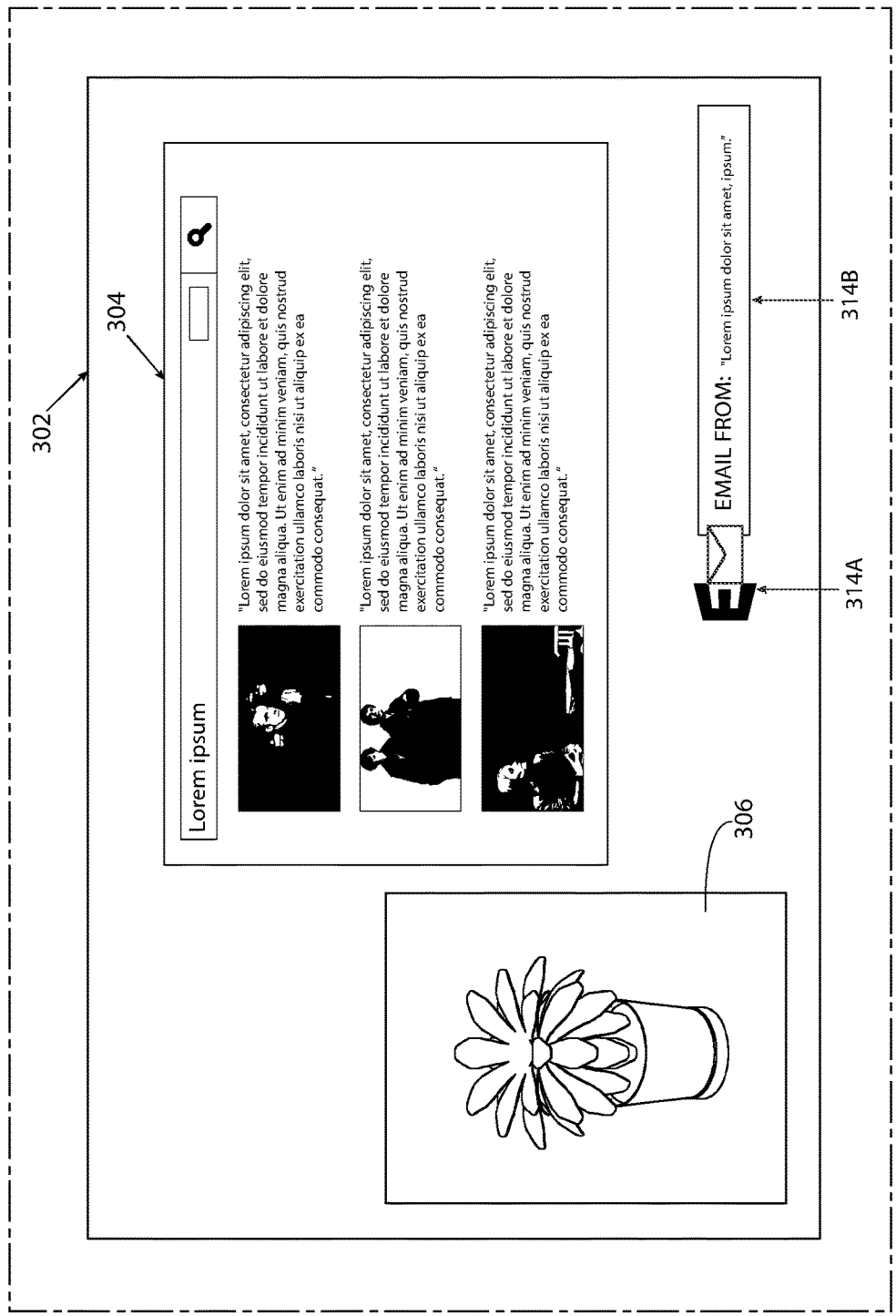

FIG. 3D is a diagram illustrating field of view 302 of FIG. 3A, further comprising display of information 314A and 314B. In the example of FIG. 3D, information 314A and 314B may be indicative of a change of information that is allocated to a virtual information region that is at least partially beyond the field of view of the head mounted display. For example, an email program may be associated with region 314 of FIGS. 3B-3C. In such an example, information 314A may be indicative of a change of information allocated to the email program, and information 314B may be visually descriptive of at least one aspect of a virtual information region event of the email program. For example, it can be seen that information 314B indicates "email from," which may indicate that the email program received a new email from a particular sender, a new email with a particular subject line, and/or the like. In at least one example embodiment, a program is allocated to a virtual information region and the determination of the occurrence of a virtual information region event comprises determination that an event associated with the program has occurred. In at least one example embodiment, determination of the occurrence of the virtual information region event comprises receipt of information by the program, and determination that the received information causes a change of information that is allocated to the virtual information region.

In some circumstances, when a virtual information region event occurs in a virtual information region that is beyond a field of view of a head mounted display, it may be undesirable to render a visual notification. For example, a visual notification may distract a user who is visually focused on a task unrelated to the virtual information region event, a visual notification may clutter the display, and/or the like. In circumstances such as these, it may be desirable to cause rendering of a non-visual notification that is indicative of the direction from the field of view in response to the virtual information region event. For example, upon receipt of the non-visual notification, the user may change his position in a direction indicated by the non-visual notification such that the virtual information region associated with the virtual information region event appears within the field of view. In this manner, the head mounted display may display the information allocated to the virtual information display region. In at least one example embodiment, an apparatus causes rendering of a non-visual notification that is indicative of a direction a virtual information region from a field of view of a head mounted display in response to a virtual information region event. In at least one example embodiment, the causation of rendering of the non-visual notification is based, at least in part, on a determination that the virtual information region is beyond the field of view of the head mounted display.

For example, in the example of FIG. 3C, the head mounted display may receive a virtual information region event associated with a virtual information region corresponding with region 312. In such an example, the head mounted apparatus may comprise a plurality of output devices similar as described regarding 262 of FIG. 2E. The apparatus may cause rendering of a non-visual notification by an output device mounted on the right side of the head mounted display to indicate that the virtual information region corresponding with region 312 has a direction that is rightward from the field of view of the head mounted display. In another example, the head mounted display may receive a virtual information region event associated with a virtual information region corresponding with region 318. The apparatus may cause rendering of a non-visual notification by an output device mounted on the left side of the head mounted display to indicate that the virtual information region corresponding with region 318 has a direction that is leftward from the field of view of the head mounted display. In at least one example embodiment, the causation of rendering of the non-visual notification is performed absent display of any visual notification indicative of the virtual information region event. In at least one example embodiment, the non-visual notification is a notification that is absent any visual representation indicative of the virtual information region event.

As previously described, an output device may be a haptic output device. A notification rendered by a haptic output device may be referred to as a haptic notification. For example, a tactile notification may be a haptic notification. In at least one example embodiment, a non-visual notification is a haptic notification. In at least one example embodiment, the rendering of a haptic notification comprises actuation of at least one haptic output device that is at a position on a head mounted display that corresponds with a direction from a field of view of the head mounted display. For example, a haptic notification may be rendered on the right side of a head mounted display to indicate the haptic notification corresponds with a field of view that is rightward of the head mounted display.

As previously described, an output device may be a spatial audio device. A notification rendered by a spatial audio device may be referred to as a spatial audio notification. For example, an audio notification rendered on a particular speaker of a plurality of speakers may be a spatial audio notification. In at least one example embodiment, a non-visual notification is a spatial audio notification. In at least one example embodiment, the rendering of the spatial audio notification comprises rendering a spatial audio signal such that a perceived location of the spatial audio signal corresponds a direction from a field of view of a head mounted display. For example, a spatial audio notification may be rendered such that a user may perceive the location of the spatial audio signal as emanating from the left side of a head mounted display to indicated a the spatial audio notification corresponds with a field of view that is leftward of the head mounted display.

In some circumstances, a user may desire for a head mounted display to cause display of a visual notification on the head mounted display. For example, the user may have perceived a non-visual notification in response to an event, and a visual notification may provide more information about the event. For example, an audio notification may indicate the user received an email, and a visual notification may reveal who the email was from. In circumstances such as these, the user may enter a visual notification invocation input. For example, a user may enter a voice input, a touch input, a button press, and/or the like in response to perception of a non-visual notification. A particular input may be indicative of a visual notification input. A visual notification input may refer to an input indicative of a user desire for a display to cause display of a visual notification. In at least one example embodiment, an apparatus determines that an input is a visual notification input. In at least one example embodiment, a head mounted display receives information indicative of a visual notification invocation input. In at least one example embodiment, an apparatus causes display of a visual notification on a head mounted display in response to a visual notification invocation input.

As previously described, a non-visual notification may correspond with a direction of a virtual information region from a field of view of a head mounted display. In some circumstances, a more than one non-visual notification may be rendered. For example virtual information region events may occur in different visual notification regions. In circumstances such as these, a user may wish to view a visual notification that is visually descriptive of at least one aspect of a particular virtual information region event. A user may indicate which virtual information region event the user wishes to view a visual notification about by way of a particular input. For example, the user may enter a visual notification invocation input comprising a touch input at a position on the head mounted display that corresponds with the direction from the field of view. For instance, if the user wishes to view a visual notification that is visually descriptive of at least one aspect of a virtual information region event with a virtual information region location that is leftward of the field of view of the display, the user may enter a visual notification invocation input on a touch sensor located on the left side of the head mounted display. In another example, if the user wishes to view a visual notification that is visually descriptive of at least one aspect of a virtual information region event with a virtual information region location that is rightward of the field of view of the display, the user may enter a visual notification invocation input on a touch sensor located on the right side of the head mounted display. For example, the user may enter a touch input by touching a touch sensor mounted on a right temple of a head mounted display comprising glasses. In at least one example embodiment, an apparatus determines a visual notification that is visually descriptive of at least one aspect of a virtual information region event in response to a visual notification invocation input. In at least one example embodiment, the visual notification invocation input comprises a touch input at a position on the head mounted display that corresponds with the direction from the field of view. In at least one example embodiment, the visual notification invocation input comprises a touch input at a position of a haptic notification rendered at the position on the head mounted display. In at least one example embodiment, the visual notification invocation input comprises a touch input at a position of a perceived location of a spatial audio signal on a head mounted display.

Figure 3E:
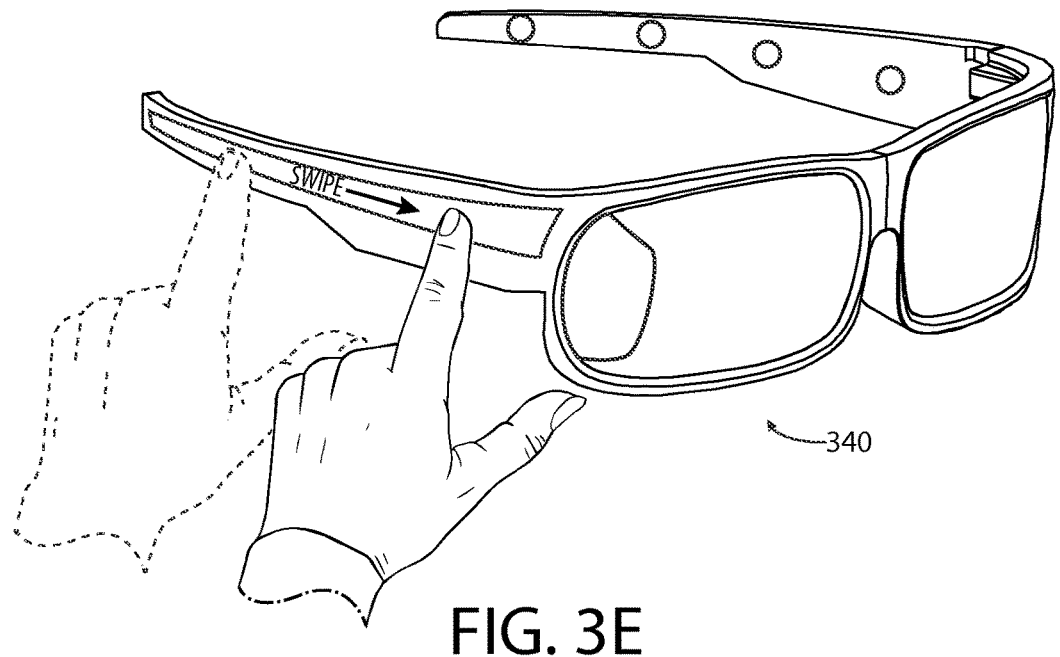

FIG. 3E is a diagram illustrating a touch input performed on a touch sensor comprised by display 340. It should be understood that in the example of FIG. 3E display 340 is a head mounted display comprising glasses. It can be seen that the touch input of FIG. 3E is a swipe input from the back of the right temple of display 340, to the front of the right temple of display 340. In this manner, the swipe input of the example of FIG. 3E comprises a movement input from a position on the head mounted display towards a field of view of the head mounted display. It should be understood that the touch input of the example of FIG. 3E may be a visual notification invocation input comprising a touch input at a position on display 340 that corresponds with the direction from the field of view. For example, the touch input may correspond with a virtual information region with a rightward direction from the field of view of display 340. In at least one example embodiment, a visual notification invocation input comprises a movement input from a position on the head mounted display towards the field of view.

In some circumstances, an apparatus may cause rendering of a non-visual notification associated with a virtual information region and a user may not enter a visual notification input in a timely fashion. This may indicate the user does not wish to view a visual notification. In circumstances such as these, it may be desirable for the apparatus to wait for a threshold duration (e.g. 5 second, 20 seconds, and or the like) after which the apparatus will not determine a visual notification. Such a threshold duration may be referred to as an input wait threshold duration. In this manner, if the user enters a visual notification input after the threshold duration, the apparatus may determine that the visual notification input may not correspond with the non-visual notification. In at least one example embodiment, an apparatus determines that a threshold duration has failed to elapse between the rendering of a non-visual notification and the visual notification invocation input. In at least one example embodiment, determination of the visual notification is based, at least in part, on the determination that the threshold duration has failed to elapse between the rendering of the non-visual notification and the visual notification invocation input. In at least one example embodiment, a threshold duration is an input wait threshold duration.

In some circumstances, an apparatus may cause rendering of a notification associated with a virtual information region, and the apparatus may cause rendering of a different notification associated with a different virtual information region before a user responds to the notification associated with the virtual information region. For example, a virtual information region event may have occurred associated with the virtual information region, and a different virtual information region event may have occurred associated with the different virtual information region. In circumstances such as these, the user may wish to enter a visual notification invocation input subsequent to rendering of the notification and the different notification to invoke a visual notification associated with the first virtual information region event. In circumstances where the virtual information region and the different virtual information have a different direction from the field of view of the head mounted display, the apparatus may render the notifications indicative of the directions, similar as previously described. In this manner, the user may enter the visual notification invocation input in a manner that selects the virtual information regions rather than the different virtual information region. For example, if the head mounted display is similar as described regarding FIG. 3E, the user may enter a touch input on the left side of the display in circumstances where the virtual information region is leftward of the field of view, and the different virtual information region is on rightward of the field of view. In this manner, the visual notification invocation input corresponds with the virtual information region event, and the determination of the visual notification may be performed in response to a determination that the visual notification invocation input corresponds with the virtual information region event.

In some circumstances, it may be desirable to terminate display of a visual notification. For example, a user may no longer wish to view the visual notification, the user may have stopped viewing the visual notification, a display threshold duration may have elapsed subsequent to display of the visual notification, and/or the like. In at least one example embodiment, an apparatus causes termination of display of a visual notification.

As previously described, a user may no longer wish to view a visual notification. In circumstances such as these, it may be desirable for a head mounted display that is displaying the notification to receive an indication from the user that the user no longer wishes to view the notification. In this manner, the head mounted display may terminate display of the notification. A user may, for example, perform a notification termination input to indicate the user's desire for the head mounted display to terminate display of the notification. For example, a user may enter a voice input, a touch input, a button press, and/or the like in to indicate the user no longer wishes to view a visual notification. A particular input may be indicative of a notification termination input. In at least one example embodiment, a head mounted display receives information indicative of a notification termination input. In at least one example embodiment, termination of display of the visual notification is performed in response to the notification termination input.

Figure 3F:
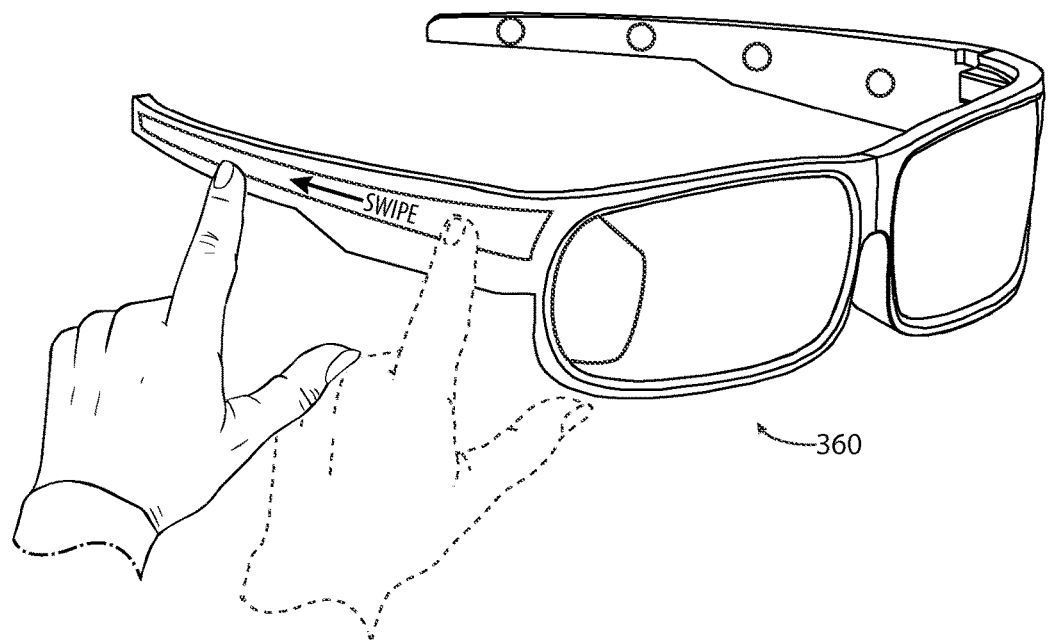

FIG. 3F is a diagram illustrating a touch input performed on a touch sensor comprised by display 360. It should be understood that in the example of FIG. 3F display 360 is a head mounted display comprising glasses. It can be seen that the touch input of FIG. 3F is a swipe input from the front of the right temple of display 360, to the back of the right temple of display 360. In this manner, the swipe input of the example of FIG. 3F comprises a movement input from a position on the head mounted display away from a field of view of the head mounted display. It should be understood that the touch input of the example of FIG. 3F may be a notification termination input comprising a touch input at a position on display 360 that corresponds with the direction from the field of view. For example, the touch input may correspond with a virtual information region with a rightward direction from the field of view of display 360. In at least one example embodiment, a notification termination input comprises a movement input from a position on the head mounted display away from the field of view.

As previously described, it may be desirable to terminate display of a visual notification when a display threshold duration has elapsed subsequent to display of the visual notification. For example, a setting may indicate that a visual notification should only be displayed for a predetermined amount of time (e.g. 5 seconds, 10 seconds, etc.). In at least one example embodiment, an apparatus determines that a threshold duration has elapsed subsequent to display of a visual notification. In at least one example embodiment, termination of display of the visual notification is performed in response to the determination that the threshold duration has elapsed. In at least one example embodiment, a threshold duration is a display threshold duration.

As previously described, a user may have stopped viewing a visual notification. For example, the user may resume viewing other information that was previously displayed on a head mounted display after viewing a visual notification. In circumstances such as these, it may be desirable for the apparatus to determine the user is no longer viewing the visual notification. For example, after the user stops viewing the notification for a predetermined period of time, the apparatus may cause termination of display of the visual notification. The apparatus may determine that a user is no longer viewing a notification by way of gaze tracking, similar as previously described. In at least one example embodiment, an apparatus determines, that a gaze of the user fails to correspond with the notification for a threshold duration. In at least one example embodiment, termination of display of the visual notification is performed in response to the determination that the gaze of the user fails to correspond with the notification for the threshold duration.

In some circumstances, a user may wish to view information allocated to a virtual information region that is beyond the field of view of a head mounted display. For example, the user may have perceived a notification of a virtual information region event associated with a virtual information region that is beyond the field of view of the head mounted display. In circumstances such as these, the user may wish to change the virtual information region location to a different virtual information region location that is within the field of view of the head mounted display. In this manner, the user may view the information without changing the field of view of the head mounted display. In circumstances such as these, it may be desirable for head mounted display to receive a notification of the user's intent to change a virtual information region location to a different virtual information region location. For example, a user may enter a visual notification selection input. For example, a user may enter a voice input, a touch input, a button press, and/or the like in to indicate the user wishes to change a virtual information region location to a different virtual information region location. A particular input may be indicative of a visual notification selection input. In at least one example embodiment, a head mounted display receives information indicative of a notification termination input. In at least one example embodiment, an apparatus changes a virtual information region location of a virtual information region to a different virtual information region location that is within the field of view of a head mounted display in response to the visual notification selection input. In at least one example embodiment, the visual notification selection input is a double tap input on the side of the head mounted display.

Figure 3G:
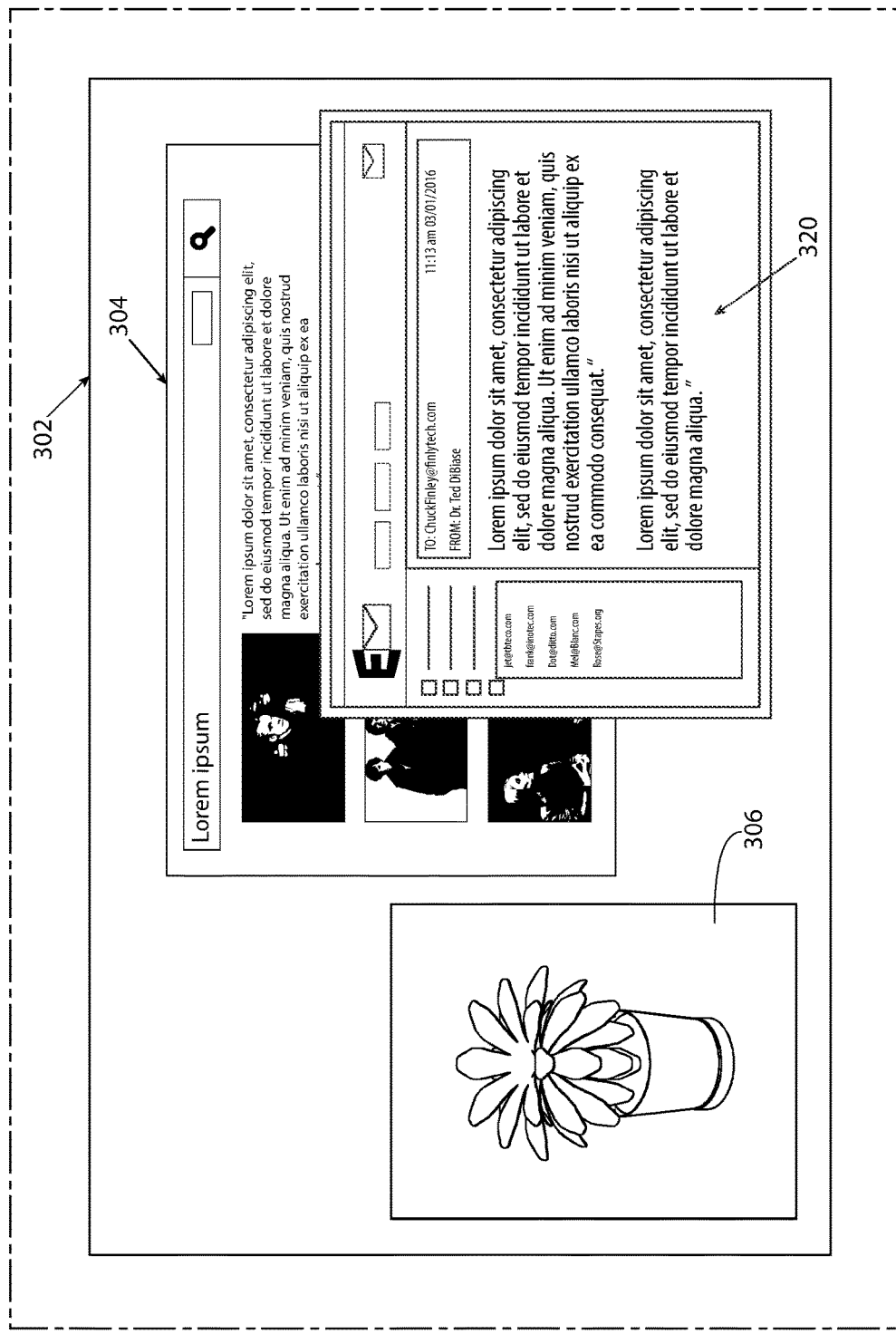

FIG. 3G is a diagram illustrating field of view 302 of FIG. 3A, further comprising display of information 320. In the example of FIG. 3G, information 320 may be representative of information that was previously allocated to a virtual information region having a virtual image region location beyond field of view 302 in the example of FIG. 3A. For example, information 320 may have previously been allocated to a virtual information region having a virtual information region location corresponding with region 314 of FIG. 3B. A user of a head mounted display may have entered a visual notification selection input (e.g., in response to perceiving a notification of a virtual information region event associated with information 320), and the head mounted display may have changed the previous virtual information region location to which information 320 was allocated to the current virtual information region location of information 320. In this manner, a user of the head mounted display is able to view information 320 while the head mounted display retains field of view 302. As such in the example of FIG. 3G, both information 304 and 320 are at least partially visible when the head mounted display has field of view 302.

In some circumstances, a user may no longer wish to view information allocated to a virtual information region that is within the field of view of a head mounted display, the user may have stopped viewing the information, a display threshold duration may have elapsed subsequent to display of the information, and/or the like. In circumstances such as these, the information may have previously been allocated to a virtual information region beyond the field of view of the head mounted display. For example, a user may have temporarily allocated the information to the current virtual information region location to quickly perceive information that would otherwise require the user to turn his head, and may wish to revert the allocation to the previous virtual information region location after the information has been viewed. In this manner, the user may quickly perceive information that would otherwise require the user to turn his head, move to a different room and/or the like. In these circumstances, it may be desirable to revert the current virtual information region location of the virtual information region to which such information is allocated to the pervious virtual information region location to which the information was allocated. In this manner, the head mounted display may discontinue display of the information from the current field of view.

For instance, in the example of FIG. 3G, a user may no longer wish to view information 320, a threshold duration may have elapsed subsequent to receipt of a visual notification selection input that established the current virtual information region location of the virtual information region to which information 320 is allocated, and/or the like. As described in a previous example, information 320 may have previously been allocated to a virtual information region having a virtual information region location corresponding with region 314 of FIG. 3B. The current virtual information region location of information 320 may be reverted to the previous virtual information region location. In this manner, the head mounted display will discontinue display of information 320 when the head mounted display has field of view 302, similar as illustrated in the example of FIG. 3A. In at least one example embodiment, an apparatus determines that a threshold duration has elapsed subsequent to the receipt of a visual notification selection input. In at least one example embodiment, an apparatus reverts from a current virtual information region location of the virtual information region to the previous virtual information region location in response to the determination that the threshold duration has elapsed.

Figure 4:
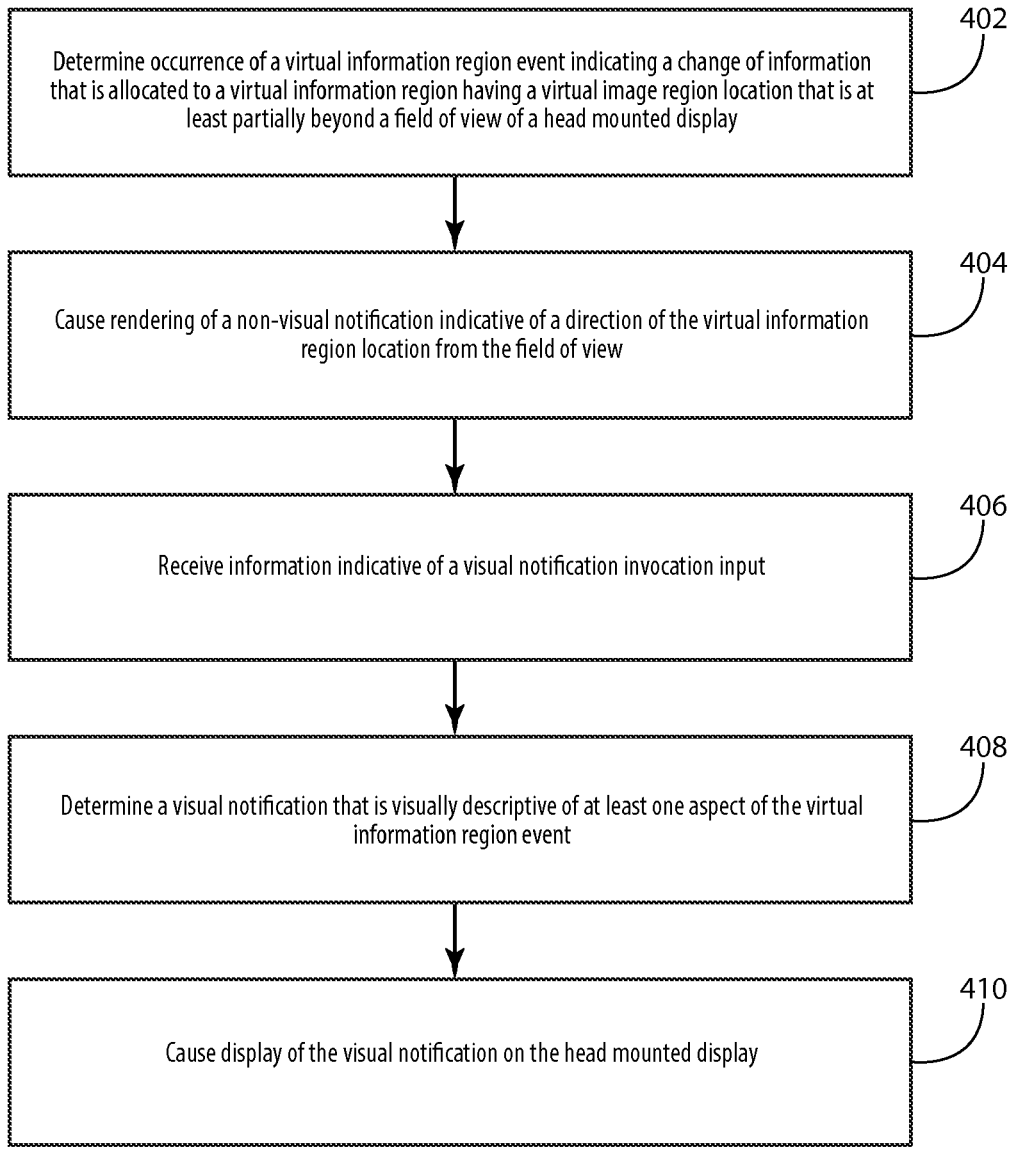
FIG. 4 is a flow diagram illustrating activities associated with rendering of a notification on a head mounted display according to at least one example embodiment.

FIG. 4 is a flow diagram illustrating activities associated with rendering of a notification on a head mounted display according to at least one example embodiment. In at least one example embodiment, there is a set of operations that corresponds with the activities of FIG. 4. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 4.

As previously described, in some circumstances, it may be desirable to display a visual notification on a head mounted display.

At block 402, the apparatus determines occurrence of a virtual information region event. In at least one example embodiment, the virtual information region event indicates a change of information that is allocated to a virtual information region that is at least partially beyond a field of view of a head mounted display. In at least one example embodiment, the virtual information region has a virtual information region location that is in a direction from the field of view. The determination, the virtual information region event, the change of information, the virtual information region, the field of view, the head mounted display, the virtual information region location, and the direction from the field of view may be similar as described regarding FIGS. 2A-2E and FIGS. 3A-3F.

At block 404, in response to the virtual information region event, the apparatus causes rendering of a non-visual notification that is indicative of the direction from the field of view. The rendering and the non-visual notification may be similar as described regarding FIGS. 2A-2E and FIGS. 3A-3F.

At block 406, the apparatus receives information indicative of a visual notification invocation input. The receipt and the visual notification invocation input may be similar as described regarding FIGS. 2A-2E and FIGS. 3A-3F.

At block 408, in response to the visual notification invocation input, the apparatus determines a visual notification that is visually descriptive of at least one aspect of the virtual information region event. The determination and the visual notification may be similar as described regarding FIGS. 2A-2E and FIGS. 3A-3F.

At block 410, the apparatus causes display of the visual notification on the head mounted display. The causation of display may be similar as described regarding FIGS. 2A-2E and FIGS. 3A-3F.

Figure 5:
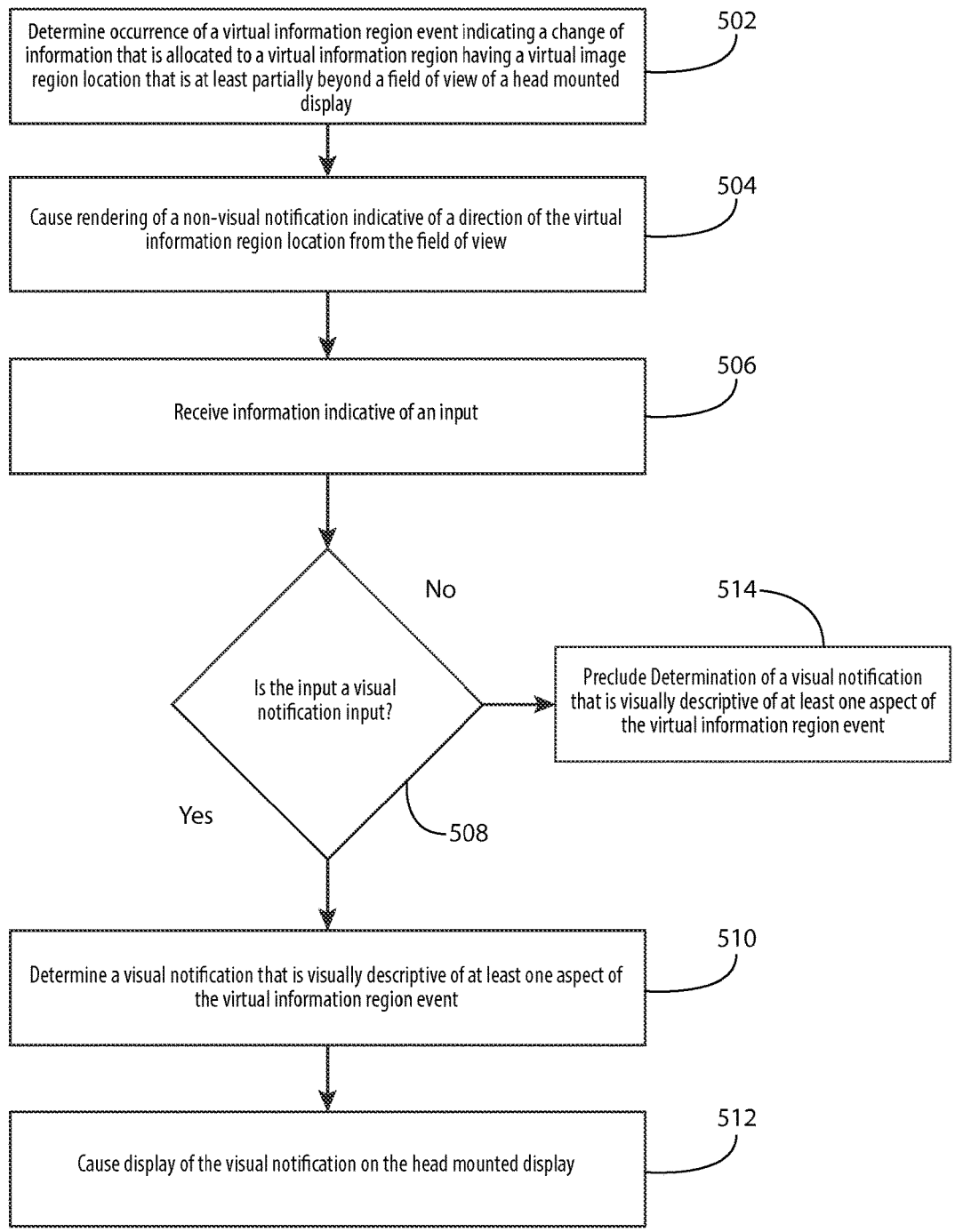
FIG. 5 is a flow diagram illustrating activities associated with receipt of a visual notification input according to at least one example embodiment.

FIG. 5 is a flow diagram illustrating activities associated with receipt of a visual notification input according to at least one example embodiment. In at least one example embodiment, there is a set of operations that corresponds with the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

As previously described, in some circumstances, an apparatus may receive an input. As previously described, in some circumstances, it may be desirable to determine if the input is a visual notification input.

At block 502, the apparatus determines occurrence of a virtual information region event, similarly as described regarding block 402 of FIG. 4. In at least one example embodiment, the virtual information region event indicates a change of information that is allocated to a virtual information region that is at least partially beyond a field of view of a head mounted display. In at least one example embodiment the virtual information region has a virtual information region location that is in a direction from the field of view. At block 504, the apparatus causes rendering of a non-visual notification that is indicative of the direction from the field of view, similarly as described regarding block 404 of FIG. 4.

At block 506, the apparatus receives information indicative of an input. The receipt and the input may be similar as described regarding FIGS. 2A-2E and FIGS. 3A-3F.

At block 508, the apparatus determines whether the input is a visual notification invocation input. If the apparatus determines that the input is a visual notification invocation input, flow proceeds to block 508. If the apparatus determines that the input fails to be a visual notification invocation input, flow proceeds to block 515. The determination and the visual notification invocation input may be similar as described regarding FIGS. 2A-2E and FIGS. 3A-3F.

At block 510, the apparatus determines a visual notification that is visually descriptive of at least one aspect of the virtual information region event, similarly as described regarding block 408 of FIG. 4. At block 512, the apparatus causes display of the visual notification on the head mounted display, similarly as described regarding block 410 of FIG. 4. At block 514, the apparatus precludes determination of a visual notification that is visually descriptive of at least one aspect of the virtual information region event. The determination, the visual notification, and the virtual information region event may be similar as described regarding FIGS. 2A-2E and FIGS. 3A-3F.

Figure 6:
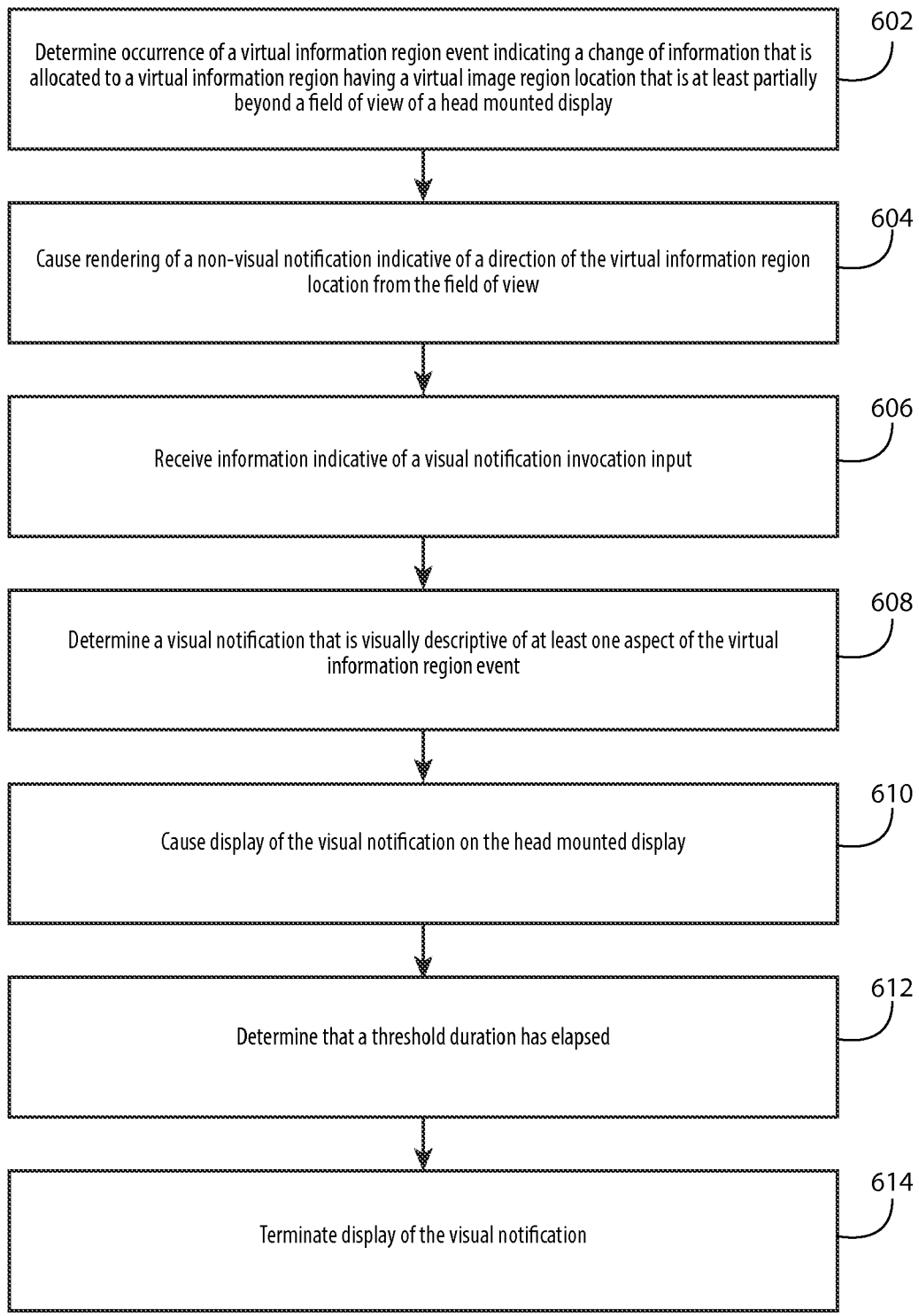
FIG. 6 is a flow diagram illustrating activities associated with termination of display a visual notification according to at least one example embodiment.

FIG. 6 is a flow diagram illustrating activities associated with termination of display a visual notification according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

As previously described, in some circumstances it may be desirable to terminate display of a visual notification.

At block 602, the apparatus determines occurrence of a virtual information region event, similarly as described regarding block 402 of FIG. 4. In at least one example embodiment, the virtual information region event indicates a change of information that is allocated to a virtual information region that is at least partially beyond a field of view of a head mounted display. In at least one example embodiment, the virtual information region has a virtual information region location that is in a direction from the field of view. At block 604, the apparatus causes rendering of a non-visual notification that is indicative of the direction from the field of view, similarly as described regarding block 404 of FIG. 4. At block 606, the apparatus receives information indicative of a visual notification invocation input, similarly as described regarding block 406 of FIG. 4. At block 608, the apparatus determines a visual notification that is visually descriptive of at least one aspect of the virtual information region event, similarly as described regarding block 408 of FIG. 4. At block 610, the apparatus causes display of the visual notification on the head mounted display, similarly as described regarding block 410 of FIG. 4.

At block 612, the apparatus determines that a threshold duration has elapsed. The determination and the threshold duration may be similar as described regarding FIGS. 2A-2E and FIGS. 3A-3F.

At block 614, in response to determination that the threshold duration has elapsed, the apparatus terminates display of the visual notification. The termination may be similar as described regarding FIGS. 2A-2E and FIGS. 3A-3F.

Figure 7:
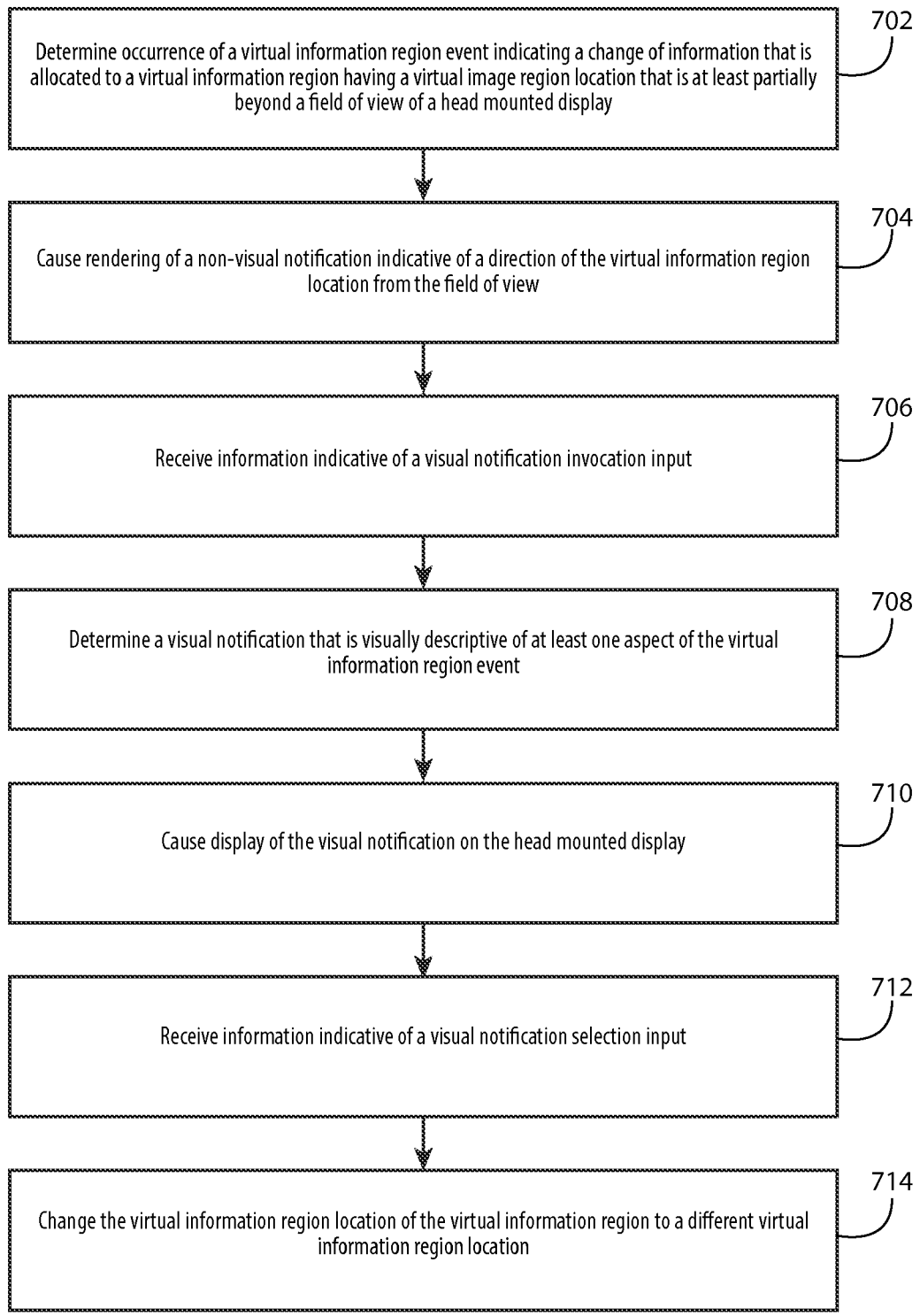
FIG. 7 is a flow diagram illustrating activities associated with receipt of a visual notification selection input according to at least one example embodiment.

FIG. 7 is a flow diagram illustrating activities associated with receipt of a visual notification selection input according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As previously described, in some circumstances an apparatus may receive a visual notification selection input. As previously described, in circumstances such as these, it may be desirable to change a virtual information region location to a different virtual information region location.

At block 702, the apparatus determines occurrence of a virtual information region event, similarly as described regarding block 402 of FIG. 4. In at least one example embodiment, the virtual information region event indicates a change of information that is allocated to a virtual information region that is at least partially beyond a field of view of a head mounted display. In at least one example embodiment, the virtual information region has a virtual information region location that is in a direction from the field of view. At block 704, the apparatus causes rendering of a non-visual notification that is indicative of the direction from the field of view, similarly as described regarding block 404 of FIG. 4. At block 706, the apparatus receives information indicative of a visual notification invocation input, similarly as described regarding block 406 of FIG. 4. At block 708, the apparatus determines a visual notification that is visually descriptive of at least one aspect of the virtual information region event, similarly as described regarding block 408 of FIG. 4. At block 710, the apparatus causes display of the visual notification on the head mounted display, similarly as described regarding block 410 of FIG. 4.

At block 712, the apparatus receives information indicative of a visual notification selection input. The receipt and the visual notification selection input may be similar as described regarding FIGS. 2A-2E and FIGS. 3A-3F.

At block 714, in response to the visual notification selection input, the apparatus changes the virtual information region location of the virtual information region to a different virtual information region location that is within the field of view. The changing and the different virtual information region location may be similar as described regarding FIGS. 2A-2E and FIGS. 3A-3F.

Figure 8:
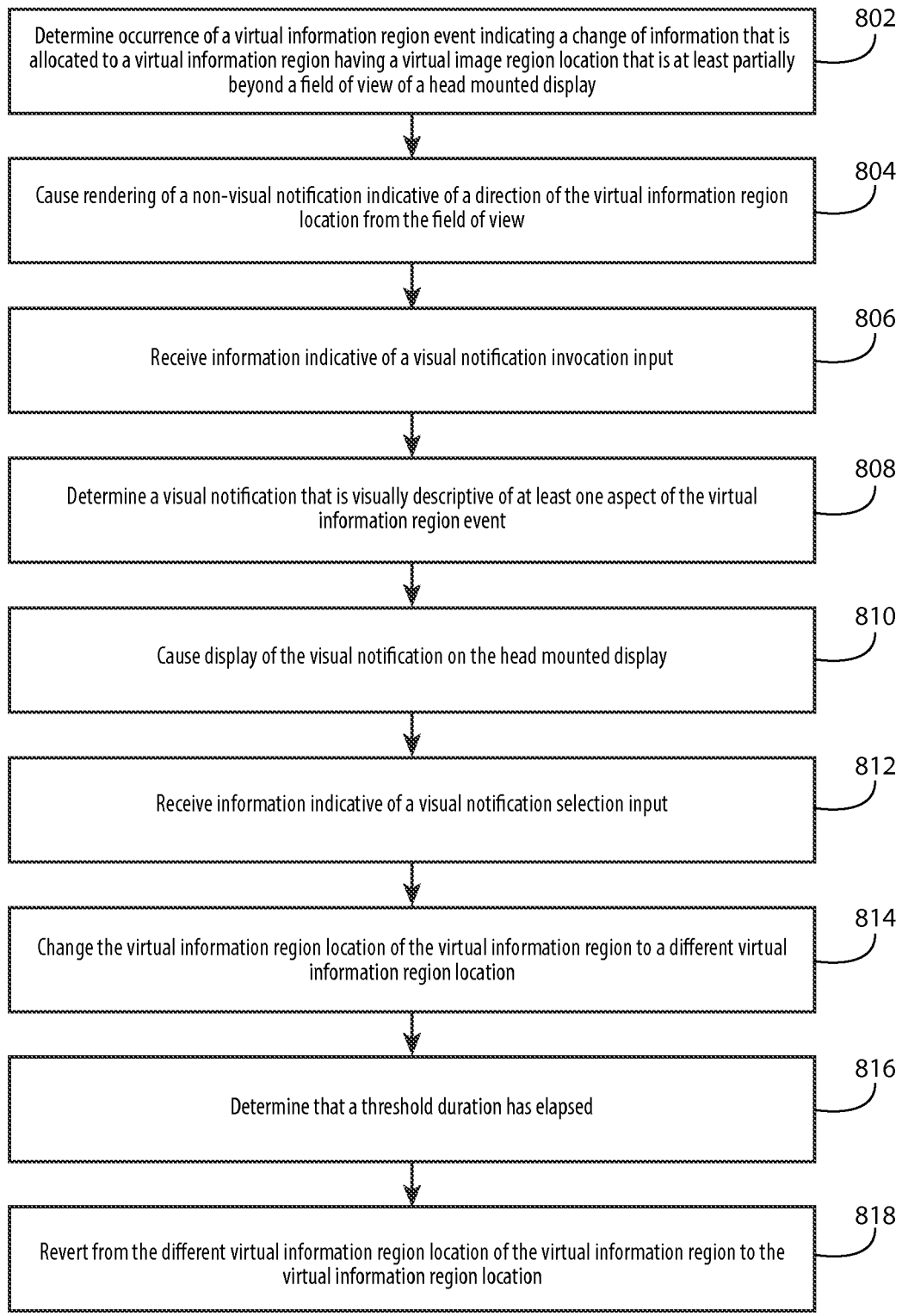
FIG. 8 is a flow diagram illustrating activities associated with reversion of a virtual information region location according to at least one example embodiment.

FIG. 8 is a flow diagram illustrating activities associated with reversion of a virtual information region location according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously described, in some circumstances, it may be desirable to change virtual information region location of a virtual information region to a different virtual information region location. As previously described, in some circumstances it may be desirable to revert from the different virtual information region location of the virtual information region to the virtual information region location.

At block 802, the apparatus determines occurrence of a virtual information region event, similarly as described regarding block 402 of FIG. 4. In at least one example embodiment, the virtual information region event indicates a change of information that is allocated to a virtual information region that is at least partially beyond a field of view of a head mounted display. In at least one example embodiment, the virtual information region has a virtual information region location that is in a direction from the field of view. At block 804, the apparatus causes rendering of a non-visual notification that is indicative of the direction from the field of view, similarly as described regarding block 404 of FIG. 4. At block 806, the apparatus receives information indicative of a visual notification invocation input, similarly as described regarding block 406 of FIG. 4. At block 808, the apparatus determines a visual notification that is visually descriptive of at least one aspect of the virtual information region event, similarly as described regarding block 408 of FIG. 4. At block 810, the apparatus causes display of the visual notification on the head mounted display, similarly as described regarding block 410 of FIG. 4. At block 812, the apparatus receives information indicative of a visual notification selection input similarly as described regarding block 712 of FIG. 7. At block 814, the apparatus changes the virtual information region location of the virtual information region to a different virtual information region location that is within the field of view similarly as described regarding block 714 of FIG. 7.

At block 816, the apparatus determines that a threshold duration has elapsed. The determination and the threshold duration may be similar as described regarding FIGS. 2A-2E and FIGS. 3A-3F.

At block 818, in response to the determination that the threshold duration has elapsed, the apparatus reverts from the different virtual information region location of the virtual information region to the virtual information region location. The determination may be similar as described regarding FIGS. 2A-2E and FIGS. 3A-3F.

Figure 9:
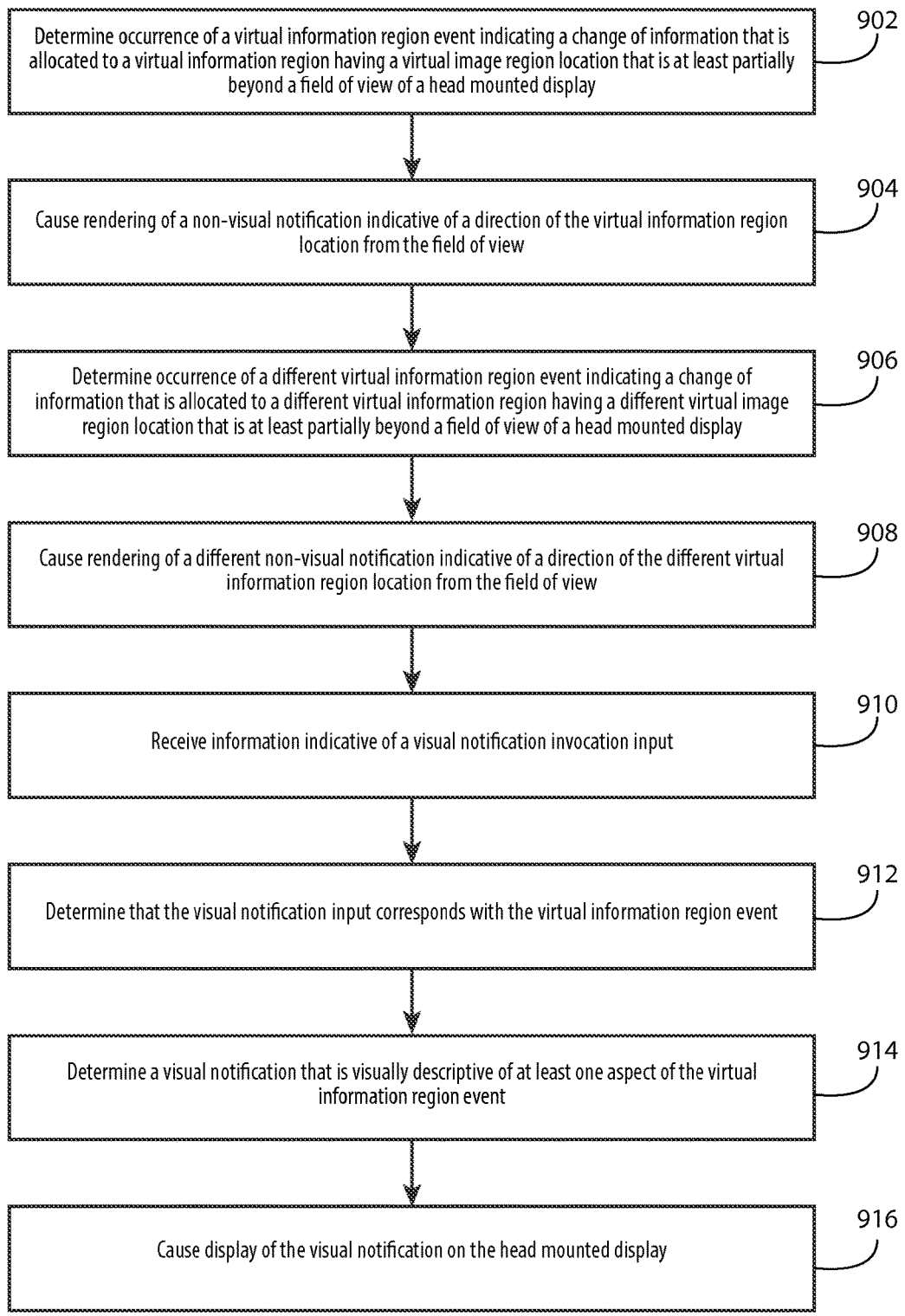
FIG. 9 is a flow diagram illustrating activities associated with determination that a visual notification input corresponds with a virtual information region event according to at least one example embodiment.

FIG. 9 is a flow diagram illustrating activities associated with determination that a visual notification input corresponds with a virtual information region event according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously described, in some circumstances a visual notification input may correspond with a particular virtual information region.

At block 902, the apparatus determines occurrence of a virtual information region event, similarly as described regarding block 402 of FIG. 4. In at least one example embodiment, the virtual information region event indicates a change of information that is allocated to a virtual information region that is at least partially beyond a field of view of a head mounted display. In at least one example embodiment, the virtual information region has a virtual information region location that is in a direction from the field of view. At block 904, the apparatus causes rendering of a non-visual notification that is indicative of the direction from the field of view, similarly as described regarding block 404 of FIG. 4.

At block 906, the apparatus determines occurrence of a different virtual information region event. In at least one example embodiment, the different virtual information region event indicates a change of information that is allocated to a different virtual information region that is at least partially beyond the field of view. In at least one example embodiment, the different virtual information region has a different virtual information region location that is in a different direction from the field of view. The determination, the different virtual information region event, the change of information, the different virtual information region, and the different direction may be similar as described regarding FIGS. 2A-2E and FIGS. 3A-3F.

At block 908, in response to the different virtual information region event, the apparatus causes rendering of a different non-visual notification that is indicative of the different direction from the field of view. The rendering and the different non-visual notification may be similar as described regarding FIGS. 2A-2E and FIGS. 3A-3F. At block 910, the apparatus receives information indicative of a visual notification invocation input, similarly as described regarding block 406 of FIG. 4.

At block 912, the apparatus determines that the visual notification invocation input corresponds with the virtual information region event. The determination may be similar as described regarding FIGS. 2A-2E and FIGS. 3A-3F.

At block 914, in response to the determination that the visual notification invocation input corresponds with the virtual information region event, the apparatus determines a visual notification that is visually descriptive of at least one aspect of the virtual information region event, similarly as described regarding block 408 of FIG. 4. At block 916, the apparatus causes display of the visual notification on the head mounted display, similarly as described regarding block 410 of FIG. 4.

One or more example embodiments may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 710 of FIG. 7 may be performed after block 712 of FIG. 7. Furthermore, if desired, one or more of the above-described functions may be optional or may be combined. For example, block 708 of FIG. 7 may be optional and/or combined with block 710 of FIG. 7.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. A method comprising:
   determining occurrence of a virtual information region event, the virtual information region event indicating a change of information that is allocated to a virtual information region that is at least partially beyond a field of view of a head mounted display, the virtual information region having a virtual information region location that is in a direction from the field of view;
   causing rendering of a non-visual notification that is indicative of the direction from the field of view in response to the virtual information region event;
   receiving information indicative of a visual notification invocation input;
   determining a visual notification that is visually descriptive of at least one aspect of the virtual information region event in response to the visual notification invocation input;
   receiving information indicative of a visual notification selection input;
   changing the virtual information region location of the virtual information region to a different virtual information region location that is within the field of view in response to the visual notification selection input; and
   causing display of the visual notification on the head mounted display.

2. The method of claim 1, wherein the causation of rendering of the non-visual notification is performed absent display of any visual notification indicative of the virtual information region event.

3. The method of claim 1, wherein the non-visual notification is a haptic notification.

4. The method of claim 3, wherein the rendering of the haptic notification comprises actuation of at least one haptic output device that is at a position on the head mounted display that corresponds with the direction from the field of view.

5. The method of claim 1, wherein the non-visual notification is a spatial audio notification.

6. The method of claim 5, wherein the rendering of the spatial audio notification comprises rendering a spatial audio signal such that a perceived location of the spatial audio signal corresponds with the direction from the field of view.

7. The method of claim 1, wherein the receipt of information indicative of the visual notification invocation input comprises:
   receiving information indicative of an input; and
   determining that the input is the visual notification invocation input, wherein the determination of the visual notification is based, at least in part, on the determination of the visual notification invocation input.

8. The method of claim 1, further comprising terminating display of the visual notification.

9. The method of claim 8, further comprising determining that a threshold duration has elapsed subsequent to display of the visual notification, wherein the termination of display of the visual notification is performed in response to the determination that the threshold duration has elapsed.

10. The method of claim 1, further comprising: determining that a threshold duration has elapsed subsequent to the receipt of the visual notification selection input; and reverting from the different virtual information region location of the virtual information region to the virtual information region location in response to the determination that the threshold duration has elapsed.

11. The method of claim 1, further comprising:
   prior to receipt of the information indicative of the visual notification invocation input, determining occurrence of a different virtual information region event, the different virtual information region event indicating a change of information that is allocated to a different virtual information region that is at least partially beyond the field of view, the different virtual information region having a different virtual information region location that is in a different direction from the field of view;
   prior to receipt of the information indicative of the visual notification invocation input, causing rendering of a different non-visual notification that is indicative of the different direction from the field of view in response to the different virtual information region event; and
   determining that the visual notification invocation input corresponds with the virtual information region event, wherein the determination of the visual notification is performed in response to the determination that the visual notification invocation input corresponds with the virtual information region event.

12. An apparatus comprising:
at least one processor; and
at least one non-transitory memory including computer program code;
the at least one memory and the computer program code configured to, with the at least one processor, cause the apparatus to perform at least the following:
  determine occurrence of a virtual information region event, the virtual information region event indicating a change of information that is allocated to a virtual information region that is at least partially beyond a field of view of a head mounted display, the virtual information region having a virtual information region location that is in a direction from the field of view;
  cause rendering of a non-visual notification that is indicative of the direction from the field of view in response to the virtual information region event;
  receive information indicative of a visual notification invocation input;
  determine a visual notification that is visually descriptive of at least one aspect of the virtual information region event in response to the visual notification invocation input;
  receive information indicative of a visual notification selection input;
  change the virtual information region location of the virtual information region to a different virtual information region location that is within the field of view in response to the visual notification selection input; and
  cause display of the visual notification on the head mounted display.

13. A computer program product comprising a computer readable non-transitory medium bearing computer program code embodied therein for use with a computer, the computer program code comprising:
  code for determining occurrence of a virtual information region event, the virtual information region event indicating a change of information that is allocated to a virtual information region that is at least partially beyond a field of view of a head mounted display, the virtual information region having a virtual information region location that is in a direction from the field of view;
  code for causing rendering of a non-visual notification that is indicative of the direction from the field of view in response to the virtual information region event;
  code for receiving information indicative of a visual notification invocation input;
  code for determining a visual notification that is visually descriptive of at least one aspect of the virtual information region event in response to the visual notification invocation input;
  code for receiving information indicative of a visual notification selection input;
  code for changing the virtual information region location of the virtual information region to a different virtual information region location that is within the field of view in response to the visual notification selection input;
and
  code for causing display of the visual notification on the head mounted display.

* * * * *